(12) United States Patent
Ralph et al.

(10) Patent No.: US 12,622,438 B2
(45) Date of Patent: May 12, 2026

(54) APPLICATION OF MICROWAVES TO ANIMALS

(71) Applicant: Wagstaff Food Services Pty Ltd, Malvern (AU)

(72) Inventors: James Henry Ralph, Malvern (AU); David William McLean, East Corrimal (AU); Joel James McLean, Balgownie (AU)

(73) Assignee: Wagstaff Food Services Pty Ltd, Malvern (AU)

(*) Notice: Subject to any disclaimer, the term of this patent is extended or adjusted under 35 U.S.C. 154(b) by 0 days.

(21) Appl. No.: 18/955,509

(22) Filed: Nov. 21, 2024

(65) Prior Publication Data

US 2025/0072435 A1     Mar. 6, 2025

Related U.S. Application Data

(62) Division of application No. 18/555,856, filed as application No. PCT/AU2022/050361 on Apr. 20, 2022, now Pat. No. 12,161,125.

(30) Foreign Application Priority Data

Apr. 20, 2021     (AU) ................................ 2021901173

(51) Int. Cl.
*A22B 3/06* (2006.01)

(52) U.S. Cl.
CPC ..................................... *A22B 3/06* (2013.01)

(58) Field of Classification Search
CPC .... A22B 3/00; A22B 3/06; A22B 3/12; A61B 18/1815; A61B 5/02; A61B 2205/3686

USPC .......................................................... 452/58
See application file for complete search history.

(56) References Cited

U.S. PATENT DOCUMENTS

| | | | |
|---|---|---|---|
| 8,506,366 B2 | 8/2013 | Ralph et al. | |
| 9,516,886 B2 | 12/2016 | Ralph et al. | |
| 2007/0254573 A1* | 11/2007 | Horst ................. | A22C 21/0061 452/58 |

(Continued)

FOREIGN PATENT DOCUMENTS

| | | |
|---|---|---|
| WO | 2011/137497 A1 | 11/2011 |
| WO | 2014/066953 A1 | 5/2014 |

OTHER PUBLICATIONS

International Search Report for International Application No. PCT/AU2022/050361, mailed Jul. 29, 2022, 5 pages.

(Continued)

*Primary Examiner* — Richard T Price, Jr.
(74) *Attorney, Agent, or Firm* — TraskBritt

(57) ABSTRACT

Methods and apparatus for inducing unconsciousness by warming of the brain of an animal by applying microwave radiation through an applicator are described. An electromagnetic flux concentrator comprises a tubular section of reducing internal cross-sectional area and at least one ridge internally thereof extending longitudinally. The applicator is pre-tuned by directing low-power microwave radiation therethrough to a load that approximates the properties of the animal's head, and adjusting the impedance of the applicator to optimize the impedance match. A compensator associated with the waveguide compensates for changes in detected reflected power.

12 Claims, 11 Drawing Sheets

(56) References Cited

U.S. PATENT DOCUMENTS

| | | | | |
|---|---|---|---|---|
| 2014/0120814 A1 * | 5/2014 | Ralph | ...................... | A22B 3/00 |
| | | | | 452/54 |
| 2014/0378959 A1 * | 12/2014 | Spertell | ................. | A61N 5/025 |
| | | | | 606/33 |
| 2015/0296811 A1 * | 10/2015 | Ralph | ...................... | A22B 3/00 |
| | | | | 452/57 |
| 2018/0360538 A1 | 12/2018 | Brannan et al. | | |

OTHER PUBLICATIONS

International Written Opinion for International Application No. PCT/AU2022/050361, mailed Jul. 29, 2022, 12 pages.
European Extended Search Report and Opinion for European Application No. 22790608, dated Jun. 5, 2025, 18 pages.
European Partial Search Report for European Application No. 22790608, dated Feb. 5, 2025, 4 pages.

* cited by examiner

POWER LEVELS DURING STUN

ENERGY TRANSFER DURING STUN

APPLICATION OF MICROWAVES TO ANIMALS

CROSS-REFERENCE TO RELATED APPLICATIONS

This application is a divisional of U.S. patent application Ser. No. 18/555,856, filed Oct. 17, 2023, which is a national phase entry under 35 U.S.C. § 371 of International Patent Application PCT/AU2022/050361, filed Apr. 20, 2022, designating the United States of America and published as International Patent Publication WO 2022/221918 A1 on Oct. 27, 2022, which claims the benefit under Article 8 of the Patent Cooperation Treaty to Australian Patent Application Serial No. 2021901173, filed Apr. 20, 2021, the disclosure of each of which is hereby incorporated herein in its entirety by this reference.

TECHNICAL FIELD

This disclosure relates to the application of microwave radiation to animals to induce reversible unconsciousness and particularly, but not exclusively, for the purpose of inducing unconsciousness prior to slaughter of the animals.

BACKGROUND

There have been proposals to apply microwave radiation of a suitable frequency and power level to warm the frontal portion of the brain of an animal to be slaughtered thereby inducing unconsciousness and syncope. In particular, two patent specifications of the present applicant describe such proposals, namely WO 2011/137497 and WO 2014/066953. The apparatus and methods described in these patent specifications aim to provide a balancing of numerous parameters or variables in the processes and apparatus to simultaneously achieve or approach including:

producing unconsciousness of the animal rapidly,
  generating microwave power at levels that can be safely managed in practical industrial plant or abattoirs,
  producing unconsciousness without killing the animal, particularly for enabling of religious or ritual slaughter compliant with Islamic "Halal" and Judaic "Shechita" criteria,
  avoiding unnecessary trauma or suffering being caused to the animal particularly so that a more humane animal slaughter is enabled.

At least some of these objectives are contradictory in the sense that more closely achieving one objective can worsen the outcome in assessing another objective. For example, using higher power levels can reduce the time to effect unconsciousness but simultaneously this can produce more singeing or blistering or burning of the skin or hide of the animal indicating suffering or trauma may more likely have been inflicted on the animal.

A particularly difficult balance of parameters in the systems of the two patent specifications identified has been related to design and operation of the applicator, which is applied to the animal's forehead for directing the microwave radiation so as to warm the frontal portion of the animal's brain. The mouth of the applicator through which microwave radiation emerges to impinge on the animal has been a site where local maxima of the electromagnetic field strength occur. This occurrence of local maxima can result in singeing, blistering or burning of the skin or hide surface and may result in arcing and consequent failure of effective controlled warming of the frontal portion of the animal's brain. Animal welfare considerations, therefore, highlight a difficulty that efforts to address in the past have been less than satisfactory or at least may have been capable of improvement. Reducing the generated power level can help to address these issues, but, as mentioned above, this can lengthen the time required to produce unconsciousness and perhaps even lead to a failure to induce unconsciousness if the animal's blood circulation through the frontal part of the brain and or in its vicinity is sufficient to continuously cool the brain and prevent syncope. Increasing the area of the mouth of the applicator can reduce the flux density and thereby any local field maxima but this can make the applicator unsuitable for many animals, particularly smaller bovines, ovines, and porcines (as well as lengthening the time to achieve effective unconsciousness). Also, a larger mouth size may reduce the effectiveness of brain heating by distributing the heating effect over a larger area of the front of the brain and lead to microwave leakage around the mouth and forehead interface with operational safety concerns.

The above references to and descriptions of prior proposals or products are not intended to be, and are not to be construed as, statements or admissions of common general knowledge in the art in Australia or elsewhere.

BRIEF SUMMARY

Provided are methods of inducing unconsciousness of an animal to be treated by applying microwave radiation to the animal in a manner that can be effective while simultaneously improving animal welfare outcomes.

Further provided are microwave applicators that can be used in applying microwave radiation to induce unconsciousness of animals while simultaneously addressing animal welfare criteria.

When used throughout this specification, including in the claims, the term "applicator" encompasses a device to which microwave energy is transferred from a separate microwave generator, e.g., through a waveguide and/or through a flexible cable, and also encompasses a device that generates microwave radiation itself at the location of application of that radiation to the animal.

According to a first aspect, the disclosure provides a method of inducing unconsciousness of an animal by applying microwave radiation, the method including: locating a microwave applicator closely adjacent to the animal's head so as to apply microwave radiation to the animal's head, the microwave applicator including: a tubular section through which microwave radiation is directed, the tubular section having a mouth through which the radiation emerges, the mouth being shaped to overlie an application zone of the animal's head, the application zone comprising a region beneath which the animal's brain is located, the applicator having at least one electromagnetic field flux concentrator extending toward the mouth so that the microwave radiation flux density emerging from the mouth is greater than the flux density in the applicator upstream of the mouth, the electromagnetic field flux concentrator comprising a narrowing part of the tubular section, which has a reducing internal cross-sectional area in the direction of the mouth, at least part of the narrowing section having at least one ridge located internally thereof and extending generally in the direction of microwave propagation toward the mouth, the provision of at least one ridge effecting an electromagnetic field flux concentration enabling an effective flux of microwave radiation to emerge through a smaller mouth than would emerge without at least one ridge, and operating a microwave generator to generate microwave radiation of a suitable frequency and power level and directing the microwave radiation through the microwave applicator to emerge from the mouth and to cause syncope by warming of the brain of the animal.

By concentrating the electromagnetic field flux using at least one ridge within the tubular section of the applicator a greater flux density can be achieved for the microwave radiation emerging from the mouth than would be achieved for the same size of mouth but without the provision of the ridges. To express this in another way, for producing the electromagnetic radiation flux at the mouth achieved with the disclosure, a greater power level of operation of the microwave generator would be required with a conventionally constructed applicator.

Preferably at least one ridge is shaped to create a progressive reduction in the cross-sectional area of the tubular section in the direction of microwave propagation toward the mouth. The or each ridge preferably comprises a ramp having a substantially flat surface progressively rising from a wall of the tubular section in the direction of microwave propagation. Preferably, the ramp has a rising part that rises continuously and reaches a crest located before the mouth. Also, preferably, the ridge has a declining ramp extending from the crest to terminate a short distance before the mouth, the declining ramp extending for a distance in the direction of microwave propagation toward the mouth, which is substantially shorter than the length of the rising part of the ramp.

The provision of a reversal of the ridge in a coupling zone before the mouth, by a tapering back of the ridge(s), preferably to a cross section having no ridge(s), effectively establishes an evanescent wave (non-propagating wave) in that coupling zone. The evanescent wave cannot escape the system unless effective coupling is made to another component (which, in use, is the animal's head) whose impedance matches that of the evanescent wave section or coupling zone. Thus, the tapering back of the ridge(s) diffuses the electric field and traps the energy until it couples with a suitable medium or load.

In the preferred embodiment, there is provided at least one pair of ridges located internally in the tubular section, the ridges of each pair being located on respective opposite walls of the tubular section. The ridges of each pair may be opposite to each other so that the cross-sectional area of the tubular section reduces generally symmetrically from opposite sides thereof.

The tubular section may be generally rectangular in cross-section and there may be four ridges, a first two of the ridges projecting from one wall of the rectangular section and the other two ridges facing the first two ridges and projecting from the opposite wall of the rectangular section.

In one possible embodiment, the applicator has a generally longitudinal axis extending in the general direction of microwave radiation propagation therethrough and the mouth of the applicator defines a plane that is not orthogonal to the longitudinal axis whereby the applicator is located in use so that the longitudinal axis is at an angle of between 70 degrees and 80 degrees to the general plane of the application zone and microwave radiation is directed partially rearwardly (caudally) toward the brain and away from nasal passages of the animal. This may more efficiently heat the animal's brain by reducing losses in moisture in the nasal passages. Preferably the or each ridge has rounded convex corners when viewed in cross-section transverse to the direction of microwave propagation through the tubular section toward the mouth. This avoids sharp convex corners where field maxima and thus arcing can occur.

According to a second aspect of the disclosure, there is provided a microwave applicator for applying microwave radiation to an animal for effecting a treatment of the animal, particularly for inducing unconsciousness by warming of the brain of the animal, the microwave applicator including: a mouth through which microwave radiation in use emerges, the mouth being sized to overlie an application zone of the animal's head, the application zone comprising a region beneath which the animal's brain is located, the microwave applicator including a tubular section through which microwave radiation is directed, the tubular section terminating at the mouth through which the radiation emerges, the tubular section having a reducing internal cross-sectional area in the direction of the mouth, wherein the tubular section has at least one ridge located internally thereof and extending generally in the direction of microwave propagation toward the mouth, the provision of at least one ridge effecting in use an electromagnetic field flux concentration enabling an effective flux of microwave radiation to emerge through a smaller mouth greater than would emerge without the at least one ridge.

The or each ridge is preferably shaped to create a progressive reduction in the cross-sectional area of the tubular section in the direction of microwave propagation toward the mouth. The or each ridge preferably comprises a ramp having a substantially flat surface progressively rising from a wall of the tubular section in the direction of microwave propagation. The ramp may rise continuously and reach a crest located before the mouth. A declining ramp extends from the crest to terminate before the mouth, the declining ramp extending for a distance in the direction of microwave propagation toward the mouth, which is substantially shorter than the length of the rising ramp.

The microwave applicator may provide at least one pair of ridges located internally in the tubular section, the ridges of each pair being located on respective opposite walls of the tubular section. The ridges of each pair may be generally opposite to each other so that the cross-sectional area of the tubular section reduces generally symmetrically from opposite sides thereof. Where the tubular section is generally rectangular in cross-section and there are four ridges, a first two of the ridges may project from one wall of the rectangular section and the other two ridges face the first two ridges and project from the opposite wall of the rectangular section.

Preferably, to inhibit arcing, the or each ridge has rounded convex corners when viewed in cross-section transverse to the direction of microwave propagation through the tubular section toward the mouth.

According to a third aspect of the disclosure, there is provided a method of stunning a subject animal for inducing unconsciousness and insensibility of the animal, the method comprising the steps:

(a) providing an applicator to be located in use in the proximity of an application zone of the subject animal's head, the application zone comprising a region overlying part of at least one of the frontal lobe and the parietal lobe and occipital lobe of the subject animal's brain located beneath the subject animal's skull, the applicator including a microwave path along which microwave radiation travels in use and the mouth through which the microwave radiation emerges from the applicator, the mouth being sized to overlie the application zone of the animal's head;

(b) locating the applicator in an operative relationship in proximity to a load that approximates the conformation and dielectric properties of the subject animal's head at the application zone;

(c) generating low power microwave radiation and directing it through the microwave path of the applicator to emerge at the mouth and thence to be applied to the load;

(d) detecting reflected power of the microwave radiation in the applicator during the application of the low power microwave radiation to the load;

(e) adjusting the impedance of the applicator to change the impedance match of the applicator with the load;

(f) repeating steps (c), (d) and (e) until an optimum impedance of the applicator that best matches with the impedance of the load is determined as indicated by a minimum reflected power being detected in step (d) of the multiple repetitions of steps (c), (d) and (e);

(g) adjusting the impedance of the applicator to match the optimum impedance determined in step (f) so as to provide a calibrated applicator;

(h) introducing the subject animal to a stunning station where the animal is to be stunned;

(i) restraining the subject animal's head at the stunning station;

(j) locating the calibrated applicator in the proximity of the application zone of the subject animal's head;

(k) generating microwave radiation of a suitable power level and frequency and directing the radiation along a microwave path to the calibrated applicator so that microwave radiation passing through the applicator and emerging through the mouth thereby heats the animal's brain beneath the application zone;

(l) detecting at a location upstream of the applicator reflected power of microwave radiation and, in response to the level of reflected power, adjusting the microwave power being delivered to heat the animal's brain;

(m) continuing the application of the microwave radiation to effect the heating for a period of time to raise the temperature of the parts of the animal's brain beneath the skull at the application zone, the period of time being sufficient to induce insensibility of the animal.

In this third aspect, preferably the steps (b) to (g) are performed once only to provide the calibrated applicator optimized for a particular animal species and physical characteristics that have heads having conformation and dielectric properties approximated by the load.

Preferably, after the calibrated applicator has been used for stunning of multiple similar animals, the steps (b) to (g) are repeated before the applicator is to be used for a number of further animals similar to each other but different from the animals of the first usage in characteristics selected from: animals of different age, animals of different size, animals of different breeds, animals of different species, animals having differing skull shapes, animals having differing skull bone densities so as to thereby provide a recalibrated applicator for a second usage involving the stunning of the further animals.

In the preferred method of the third aspect, the load used in step (b) comprises a cadaver animal head.

Preferably the low power microwave radiation generated in step (c) does not produce significant heating of the load resulting in significant change in the dielectric properties of the load during the steps (c) to (f).

Preferably, the step (e) comprises adjusting physical features or conformation of the microwave path. For example, the adjusting of the physical features or conformation comprises adjusting the position of at least one selectively moveable body located within the microwave path. The selectively moveable bodies may comprise at least two metallic or other microwave affecting bodies that are each selectively moveable within the microwave path.

The step (f) may comprise multiple individual and discrete repetitions of steps (c) to (e), and the step (d) of each repetition the reflected power of microwave radiation is recorded, and the optimum impedance of the applicator comprises selecting from the repetitions the impedance that was the minimum of the recorded reflected power detections.

The step (f) may comprise continual adjustment of the impedance of the applicator while step (c) is performed continuously so as to tune the applicator until the optimum impedance indicated by a minimum in the detected reflected power is determined.

The step (g) may include fixing the applicator against variation of its impedance to deviate from the optimum impedance and thereby provide the calibrated applicator.

The detection in step (l) of microwave radiation reflected in the microwave path may be performed by using a directional coupler associated with the microwave path and operable to measure the complex reflection coefficient of the animal's head thereby enabling determination in real time of the power being transferred through the calibrated applicator to the animal's head.

To compensate for changes in power transfer indicated by changes in reflected power two possible steps of the method are (1) tuning the microwave path, and (2) changing the level of power generated, or possibly both options can be utilized.

In the first of these compensating methods, these may be provided a step of (l) (i) tuning the microwave path in response to the level of reflected power detected in step (l), the tuning of the microwave path occurring during the continued direction of the microwave radiation through the waveguide and through the calibrated applicator so as to reduce the reflected power being detected and thereby change the impedance of the microwave path and the calibrated applicator to substantially match the impedance of the animal's head and thereby increase the transfer of microwave power to the animal's head.

The calibrated applicator may be located immediately adjacent to and receiving microwave radiation from an auto-tuner that performs steps (l) and (l)(i), the auto-tuner being located downstream of a flexible cable through which power at the microwave frequency is transmitted to an adaptor where the microwave radiation in the applicator is generated.

In the second of these compensating methods, there may be provided a step of (l)(ii) changing the level of power generated in step (k) in response to the level of reflected power detected in step (l), the changing of the level of power generated during the continued direction of the microwave radiation through the waveguide and through the calibrated applicator in response to the reflected power being detected, the level of power generated being increased in response to an increase in the detected reflected power and vice versa, so as to thereby change the effective net power being transferred to generally maintain a predetermined rate of heating of the animal's brain despite changes in reflected power.

According to a fourth aspect of the disclosure, there is provided an animal stunning apparatus for inducing unconsciousness and insensibility of a live subject animal, the apparatus comprising:

an applicator relatively moveable in relation to the live subject animal's head for bringing the applicator into proximity with an application zone of the subject animal's head, the application zone overlying part of at least one of the frontal lobe and parietal lobe and occipital lobe of the animal's brain located beneath the skull, the applicator including a microwave path along which microwave radiation travels in use and a mouth through which the microwave radiation emerges, the mouth being sized to overlie the application zone of the animal's head, the microwave path having physical features or a conformation that is selectively adjustable to adjust the impedance of the applicator to match with a load to which microwave radiation passing though the microwave path and emerging from the mouth has been applied, the selectively adjustable physical features or conformation of the microwave path being adjusted to approximate an optimum impedance of the applicator that is preselected to approximate an expected imped- ance of the subject animal's head;

a microwave generator for generating microwave energy of a suitable power level and frequency;

a waveguide located to receive and direct the microwave radiation from the generator to the applicator located at an operative end of the waveguide to thereby heat the animal's brain beneath the application zone in the proximity of which the mouth of the applicator is located in use;

a compensator operatively associated with the waveguide and configured to detect reflected power of microwave radiation in the waveguide resulting from the degree of impedance matching between the applicator and the animal's head and that compensates for changes in detected power so as to maintain a predetermined rate of transfer of microwave power to the animal's head; and a switch operable to discontinue the application of micro- wave radiation effecting heating of the animal's brain beneath the application zone after a period of time sufficient to raise the temperature of the animal's brain to induce unconsciousness and insensibility.

In this aspect, the physical features or conformation of the microwave path of the applicator preferably comprises at least one selectively moveable body located within the microwave path and operative to enable selective adjustment of the impedance of the applicator. The at least one selec- tively moveable body may comprise at least two metallic or other microwave affecting bodies that are each selectively moveable within the microwave path.

The applicator preferably includes a waveguide portion of generally constant internal cross-sectional area leading to a tapering or narrowing section of internal cross-sectional area reducing in the direction of the mouth. In this case, the selectively adjustable physical features or conformation is provided in the waveguide portion of generally constant internal cross-sectional area. For example, the waveguide portion of generally constant internal cross-sectional area may have a slot in a wall thereof, the slot extending generally longitudinally in the direction of the microwave radiation propagation through the waveguide portion, and a moveable body within the waveguide portion is moveable longitudinally by external manipulation and movement thereof along the slot.

The compensator may comprise a directional coupler associated with the waveguide and operable to measure the complex reflection coefficient of the subject animal's head thereby enabling determination in real time of the power being transferred through the calibrated applicator to the subject animal's head.

In one embodiment, the directional coupler is operatively associated with an auto-tuner operative to tune the wave- guide to reduce the reflected power and maintain an approxi- mation of optimal impedance matching between the appli- cator and animal's head.

In an alternative embodiment, instead of using an auto- tuner, the compensator may comprise a reflected power detector and associated power controller operative in response to changes in a level of power detected by the reflected power detector to vary the power from the micro- wave generator being transferred through the waveguide so as to generally maintain a predetermined rate of energy transfer to the animal's head despite changes in reflected power during a stunning operation.

In this embodiment, the power controller has an operating program to determine and implement changes to the power being generated by the microwave generator based on a selectively programmable target total energy to be effec- tively transferred to the animal's head in a programmable target time duration.

According to a fifth aspect of the disclosure, there is provided a method of inducing unconsciousness of an ani- mal by applying microwave radiation, the method including: locating a microwave applicator closely adjacent to a part of the animal's body so as to apply microwave radiation to the animal, the microwave applicator including a mouth through which microwave radiation emerges, the mouth being sized to overlie and application zone of the animal's head, the application zone comprising a region beneath which the animal's brain is located, the step of locating the microwave applicator comprising positioning the microwave applicator so that the mouth is spaced from the surface of the appli- cation zone of the animal by a separating space, the appli- cator having a microwave-permeable medium bridging the separating space so that any relatively high intensity electric fields forming adjacent boundaries of the mouth reduce in strength across the separating space from the boundaries to the surface of the animal's head at the application zone; and generating microwave radiation of a suitable frequency and power level and directing the microwave radiation through the microwave applicator to emerge from the mouth and to cause syncope by warming of the brain of the animal.

Preferably the step of locating the microwave applicator is performed so that the thickness of the separating space is generally constant around the boundaries of the mouth. A surprising and advantageous benefit of spacing the bound- aries of the mount a short distance from the surface of the animal's head, particularly spacing by a uniform and regu- lated gap throughout the relevant area, is that an auto-tuner used in the waveguide from the microwave generator to the applicator becomes more efficient as the reduction or elimi- nation of arcing means that compensation by dynamic tuning is not required as frequently during an animal stun- ning operation. This can increase the efficiency of power transfer to the animal and can reduce the time required to produce syncope.

The microwave-permeable medium may consist of or include ambient air of the separating space. Preferably, however, the applicator includes a spacer that is provided around the boundaries of the mouth and that is composed of the microwave-permeable medium and the step of locating the microwave applicator closely adjacent to the surface of the animal's head at the application zone comprises abutting the spacer against the surface of the animal's head.

By providing a microwave-permeable spacer between the edges of the mouth of the applicator and the surface of the animal's head, any local electric field maxima at the edges of the mouth are spaced from the surface by the thickness or other dimension by which the spacer separates the mouth edges from the surface whereby the field is partially dispersed across that separation distance.

Spacing the mouth from the surface of the animal's head is a significant departure from previously assumed essential criteria for microwave animal stunning by frontal brain warming, in fact such spacing is a reversal of practice in what was considered essential. Previously any spacing and consequent microwave leakage has been avoided and even positively countered, e.g., by a proposed metal braided lip around the mouth to seal against radiation leakage, because leakage reduces the efficiency of power transfer to effect brain warming and also creates potential hazards for operational safety of personnel. Surprisingly, however, the loss of efficiency by using the spacing can be offset by efficiency gains, e.g., with a smaller mouth and/or higher power operation without arcing. The operational safety issues are manageable.

In a preferred embodiment, the microwave applicator includes a tubular section through which microwave radiation is directed, the tubular section terminating at the mouth through which the radiation emerges, the tubular section having a reducing internal cross-sectional area in the direction of the mouth.

Preferably the microwave-permeable spacer comprises a microwave-permeable window located at the mouth so that the edges of the tubular section defining the mouth are spaced from the animal by a distance equal to or greater than the thickness of the window whereby effects of localized electric field maxima at the mouth on the animal's skin or hide surface, in particular, singeing or blistering or burning of the skin or hide surface, are minimized by the field strength reduction across the thickness of the window.

Preferably, the microwave-permeable window is located closely adjacent to but outside of the mouth in the direction of microwave propagation through the mouth, the window having a greater area than the mouth so as to overlap the perimetric edges of the mouth. The microwave-permeable window may comprise a sheet of mica, PTFE, quartz or other microwave-permeable material.

In a preferred embodiment, the window substantially closes the mouth to ingress of foreign matter into the tubular section, particularly ingress of particles, such as dust, dander, animal hair, and water droplets, which can promote arcing within the tubular section or at the mouth when microwave radiation is propagating through the tubular section toward and through the mouth.

The tubular section may be at least partially filled with a dielectric material to enable a greater flux density of microwave radiation to propagate therethrough and/or a smaller area of mouth to be provided while achieving the desired effective flux density to be applied to the animal. A suitable dielectric material may be PTFE (polytetrafluoroethylene) (sometimes know by the trademark TEFLON®). In this case the PTFE filling may project a short distance out from the mouth and, if desired, be extended laterally a short distance beyond the perimeter of the mouth so as to constitute the microwave-permeable window between the mouth and the surface of the skin or hide of the animal.

To alleviate potential operational safety issues arising from microwave leakage resulting from the spacing of the mouth from the forehead surface, preferably there is further provided a microwave absorptive shield associated with the applicator and surrounding a transfer zone through which the microwave energy passes from the mouth of the applicator to the surface of the animal's head, the microwave absorptive shield not being opaque to microwave radiation.

Preferably the microwave absorptive shield is not opaque to microwave radiation, such as being composed of metal, but contains or is composed of material and/or structures that absorb microwave energy.

For example, the microwave absorptive shield may contain liquid phase water contained in a shielding body located to surround the transfer zone. The shielding body may be a shaped container for the water, e.g., a shaped sponge body impregnated with water and located to surround the peripheral edges of the separating space between the mouth and the forehead surface. The water may be replenished in use as it heats from microwave radiation exposure and evaporates.

Other microwave absorptive materials may be useable, such as some graphite or other carbon compounds or materials, ferrite powder, silicon carbide, foam substances. The shielding body may be selectively retractable, e.g., for enabling servicing such as cleaning, sterilizing, etc., of the applicator.

According to a sixth aspect of the disclosure, there is provided an animal stunning apparatus for inducing unconsciousness and insensibility of a live subject animal, the apparatus comprising:

an applicator relatively moveable in relation to the live subject animal's head for bringing the applicator into proximity with an application zone of the subject animal's head, the application zone overlying part of at least one of the frontal lobe and parietal lobe and occipital lobe of the animal's brain located beneath the skull, the applicator including a microwave path along which microwave radiation travels in use and a mouth through which the microwave radiation emerges, the mouth being sized to overlie the application zone of the animal's head;

a microwave generator for generating microwave energy of a suitable power level and frequency;

a microwave energy transmission path to receive and direct the microwave energy from the generator to the applicator located at an operative end of the microwave energy transmission path to thereby heat the animal's brain beneath the application zone in the proximity of which the mouth of the applicator is located in use, the microwave energy transmission path including a flexible transmission cable enabling movement of the applicator to locate the applicator over the application zone, the microwave transmission path further including an applicator waveguide to which the cable leads and in which microwave radiation is guided toward the applicator;

an auto-tuner operatively associated with the applicator waveguide of the microwave energy transmission path and configured to detect reflected power of microwave radiation in the applicator waveguide resulting from the degree of impedance matching between the applicator and the animal's head and which tunes the applicator waveguide to reduce the reflected power and increase the transfer of microwave power to the animal's head; and a switch operable to discontinue the application of microwave radiation effecting heating of the animal's brain beneath the application zone after a period of time sufficient to raise the temperature of the animal's brain to induce unconsciousness and insensibility.

In this sixth aspect of the apparatus the microwave energy transmission path downstream of the auto-tuner preferably has at least one physical feature or a conformation that is selectively adjustable to adjust the impedance of the applicator to match with a load to which microwave radiation passing though the microwave path and emerging from the mouth has been applied, the selectively adjustable physical feature or conformation of the microwave energy transmission path being adjusted to provide an optimum impedance of the applicator, which is preselected to approximate an expected impedance of the subject animal's head. Preferably the physical feature or conformation of the microwave energy transmission path of the applicator comprises at least one selectively moveable body located within the microwave path and enabling selective adjustment of the impedance of the applicator to pre-tune the applicator before first use of the apparatus to induce unconsciousness of subject animals.

According to a seventh aspect of the disclosure, there is provided a method for treating an animal by applying microwave radiation comprising locating and confining an animal to be treated, locating a microwave applicator according to the second aspect of the disclosure so that the mouth is located adjacent to the animal where the microwave radiation is to be applied, followed by generating microwave radiation of a suitable frequency and a power level and directing the microwave radiation through the microwave applicator. The treatment of the animal may comprise inducing unconsciousness, and for this purpose the microwave applicator is located so that the mouth is located adjacent to the animal's head in close proximity to and overlying the frontal portion of the brain of the animal whereby the application of the microwave radiation causes syncope by warming of the frontal portion of the brain, the syncope either (i) being accompanied by irreversible brain function damage and slaughter substantially immediately thereafter, or (ii) being reversible by discontinuing the application of microwave radiation and allowing cooling of the brain and consequent recovery of the animal without significant impairment of brain function.

According to an eighth aspect of the disclosure, there is provided an animal product produced from an animal that has been treated by any of the methods according to the disclosure to induce unconsciousness of the animal, followed by slaughter of the animal while unconscious, and followed by subsequent production of the animal product from the slaughtered animal.

The locating and confining of an animal to be treated may include confining and positioning the animal's head, e.g., as described in WO 2011/137497 and WO 2014/066953.

BRIEF DESCRIPTION OF THE DRAWINGS

Possible and preferred features of the disclosure will now be described with particular reference to the accompanying drawings. However, it is to be understood that the features illustrated in and described with reference to the drawings are not to be construed as limiting on the scope of the disclosure. In the drawings.

DETAILED DESCRIPTION

Figure 1A:
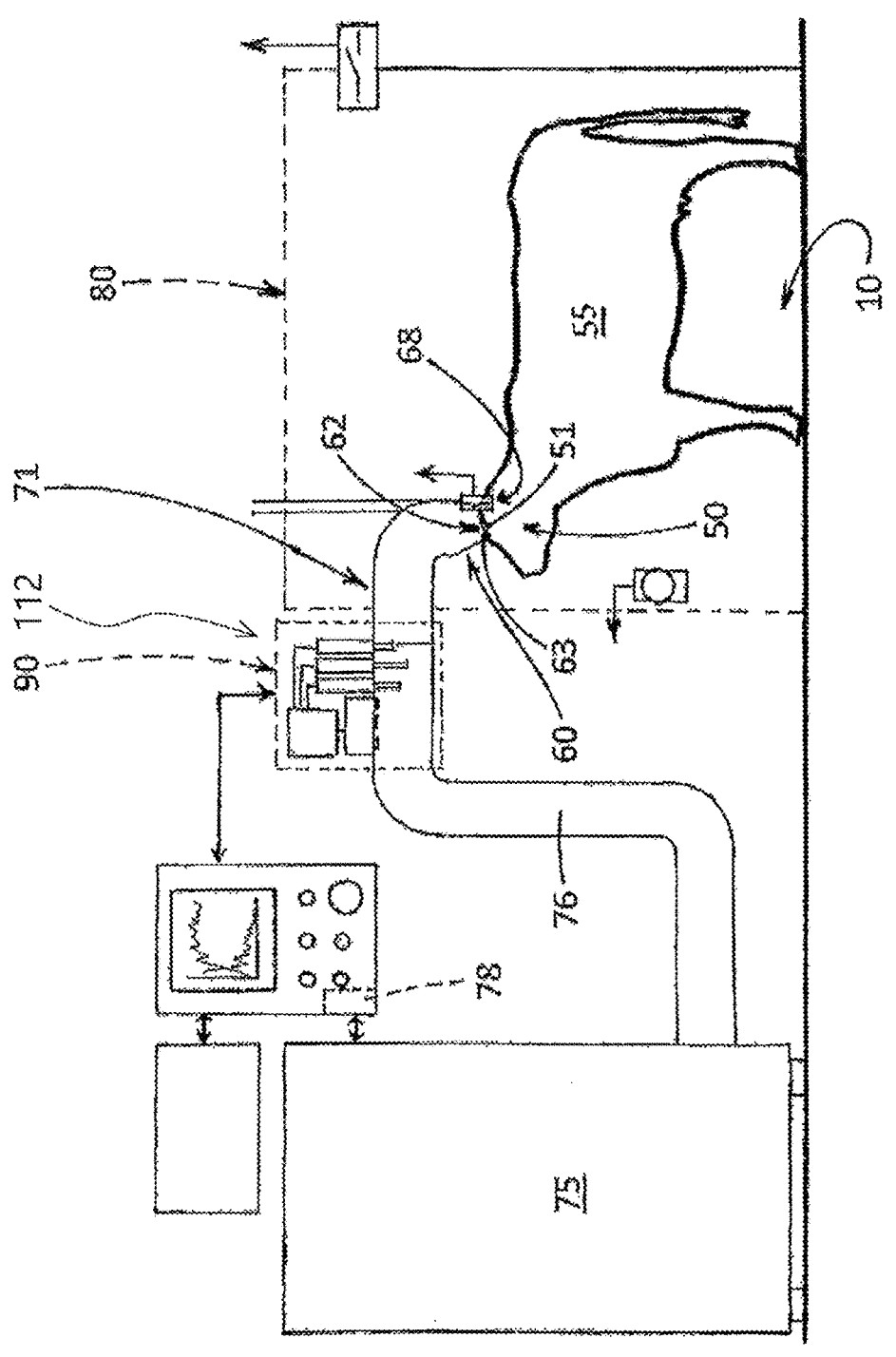
FIG. 1A is a schematic view of a complete system for stunning an animal by application of microwave radiation to the frontal portion of the animal's brain thereby inducing syncope.

The general view of a system in FIG. 1A includes a stunning station 10 where an animal 55 to be slaughtered is located and confined, although the confining apparatus is not illustrated. A microwave generator 75 in use directs microwave radiation of a suitable frequency and power level through waveguide 76 to applicator 60, which has an opening mouth 62 located closely adjacent to the animal's head 50 at an application zone 51, which is shown on the forehead of the animal 55 overlying the frontal portion of the animal's brain. In this embodiment, the animal's head may be restrained and lifted to contact the applicator. An auto-tuner 90 is used in the system of FIGS. 1A and 1B to detect reflected radiation power and to tune the system to maximize effective power transfer to the animal during the generation and application of the microwave energy. Other features of the system in FIGS. 1A and 1B and, more generally, about construction and operation of the system, can be understood by referring to the patent specification WO2014/066953, the contents of which are incorporated herein by this cross-reference.

In operation, the applicator 60 is relatively moved into proximity with an application zone 51 of the subject animal's head. The application zone 51 in FIG. 1A is overlying the frontal portion of the animal's brain, but in FIG. 1C, the application zone 51 can include part of at least one of the frontal lobe and parietal lobe and occipital lobe of the animal's brain located beneath the skull. The applicator includes a microwave path along which microwave radiation travels in use and mouth 62 through which the microwave radiation emerges, the mouth 62 being shaped and sized to overlie the application zone 51 of the animal's head. The edge or lip of the mouth 62 may be rolled or rounded to inhibit arcing. The application zone may even include the poll of the animal's head, which is defined as the occipital protrusion at the back of an animal's skull, particularly a bovine skull.

Heating of the animal's brain toward or at the occipital lobe or even the brain stem that may occur when heating at the poll is suitable for irreversible stunning of an animal for immediate slaughter. Some species or varieties of animals (e.g., possibly buffalo, camels) may require application of the microwave energy at the poll as heating access to the underlying brain may not be possible through the forehead or at least may be more effective through the poll.

Figure 1B:
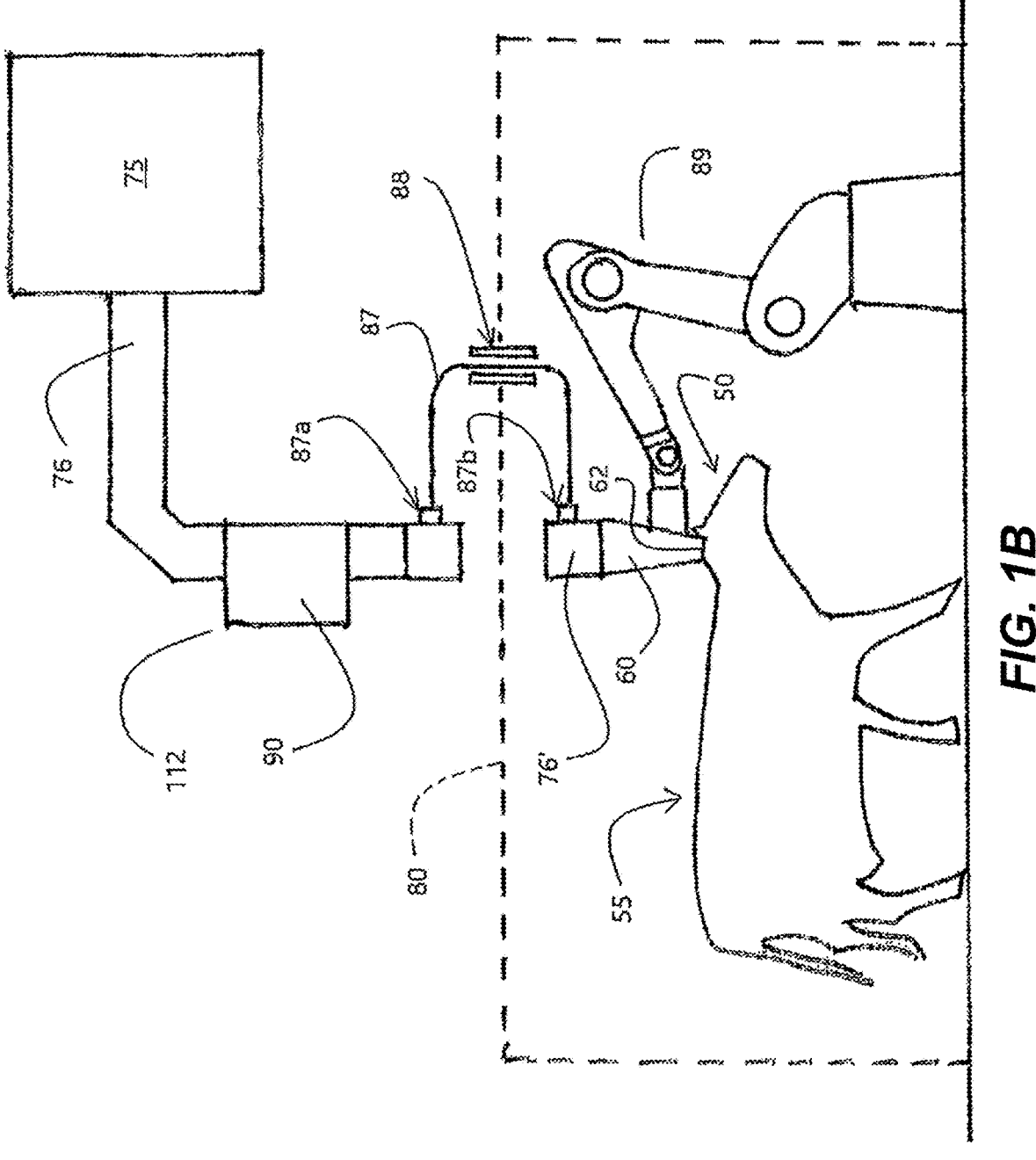
FIG. 1B is a schematic view of a complete system for stunning an animal by application of microwave radiation to a larger range of areas of application zone using an applicator supplied through a flexible cable.
Figure 1C:
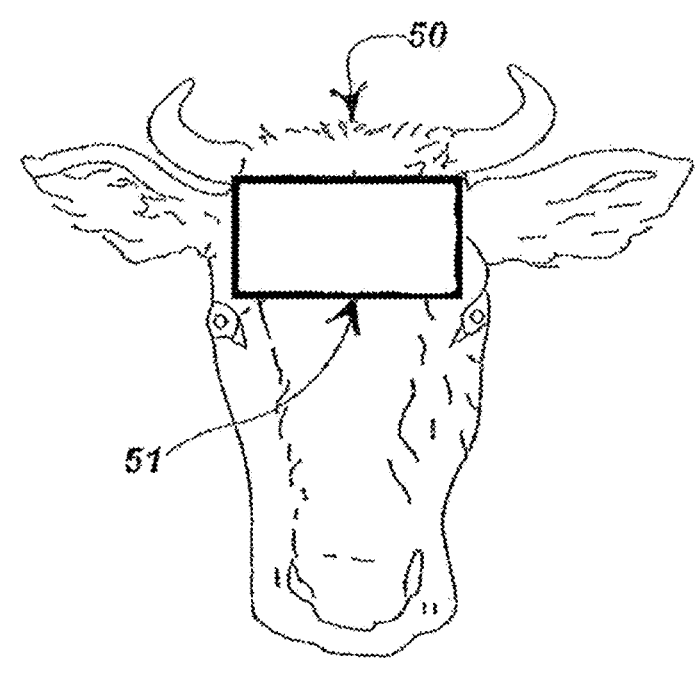
FIG. 1C illustrates possible areas for location of the application zone.

In the alternative embodiment of FIG. 1B, the microwave energy transmission path from the generator 75 includes a flexible transmission cable 87 such as a suitable high power coaxial cable enabling movement of the applicator 60 to locate the applicator over the application zone 51. In this embodiment, the animal's head may be restrained and the applicator moved by the positioning system 89 to locate the applicator as desired. The microwave transmission path further includes applicator waveguide 76' to which the cable 87 leads and in which microwave radiation is guided to the applicator 60. The coaxial cable received the microwave energy through a transition unit or adaptor 87a, and passes the microwave energy to the applicator waveguide 76' inside the Faraday cage 80 through transition unit or adaptor 87b. A choke 88 passes the cable 87 through the cage while preventing leakage to outside the cage of microwave radiation.

The auto-tuner 90 operatively associated with the applicator waveguide 76' of the microwave energy transmission path is configured and operative to detect reflected power of microwave radiation in the applicator waveguide 76' resulting from the degree of impedance matching between the applicator 60 and the animal's head 50 and that tunes the applicator waveguide to reduce the reflected power and increase the transfer of microwave power to the animal's head.

A switch (78 in FIG. 1A, not shown in FIG. 1B) is operable to discontinue the application of microwave radiation effecting heating of the animal's brain beneath the application zone after a period of time sufficient to raise the temperature of the animal's brain to induce unconsciousness and insensibility.

FIGS. 2 to 6C show features of embodiments of an applicator 60 according to the disclosure. The applicator 60 includes a tubular section 61 through which the microwave radiation is directed, which ends in the mouth 62 through which the radiation emerges. In use, the mouth 62 is located closely adjacent to the application zone 51 of the animal's body where the microwave radiation is to be applied. The tubular section 61 has a reducing internal cross section area in the direction of the mouth 62.

The tubular section 61 has at least one and, as illustrated, preferably multiple ridges 65 located internally and extending in the direction of microwave propagation toward the mouth 62. The ridges effect an electromagnetic field of flux concentration enabling an effective flux of microwave radiation to emerge through a smaller mouth 62 than would emerge without the ridges 65. The mouth size may be about 120 mm by 60 mm (compared to the prior applicator in WO2014/066953, which was 150 mm by 120 mm) receiving microwave radiation from a waveguide of 248 mm by 124 mm cross sectional size. Each ridge 65 is shaped to create a progressive reduction in the cross-sectional area of the tubular section 61 in the direction of microwave propagation. The descending ramp 68 of each ridge 65 reverses the provision of ridges along the tubular section 61 to define a coupling zone 64 immediately before the mouth 62. As illustrated the ridges 65 taper down so that there is no ridge at the mouth 62. This configuration effectively establishes an evanescent wave (non-propagating wave) in the coupling zone 64. The evanescent wave cannot escape the system unless effective coupling is made to another component (which, in use, is the animal's head 50) whose impedance matches that of the evanescent wave section or coupling zone 64. Thus, the tapering back of the ridge(s) 65 diffuses the electric field and traps the energy until it couples with a suitable medium or load. This is believed to be a unique design of a microwave system.

In the illustrated embodiments, each ridge 65 has a ramp 66 having a substantially flat surface progressively rising from a wall of the tubular section 61 in the direction of microwave propagation. Each ramp 66 rises continuously and reaches a crest 67 located a distance from the mouth 62. A descending ramp 68 extends from the crest 67 and terminates adjacent the mouth 62 (e.g., in FIG. 2) or terminates a short distance (e.g., about 20 cm) before the mouth 62 (e.g., in FIG. 5 or 6), the descending ramp 68 extending for a distance in the direction of microwave propagation toward the mouth 62, which is substantially shorter than the length of the rising ramp 66. Ridges are used in the system primarily for this purpose of reducing the applicator cross section area to match the area and shape of an animal's head profile. A consequence can be production of intense and concentrated head heating around the vicinity of the ridge. By terminating the ridges before the applicator opening, this intensity was reduced and the field spread more evenly across the opening, i.e., interface between applicator and head. This resulted in a more even heating pattern on the animal's head.

Dimensions including lengths, widths, heights of the ridges are empirically determined, as well as their positioning (axial, lateral, upper/lower wall and termination distances before the mouth).

Figure 2:
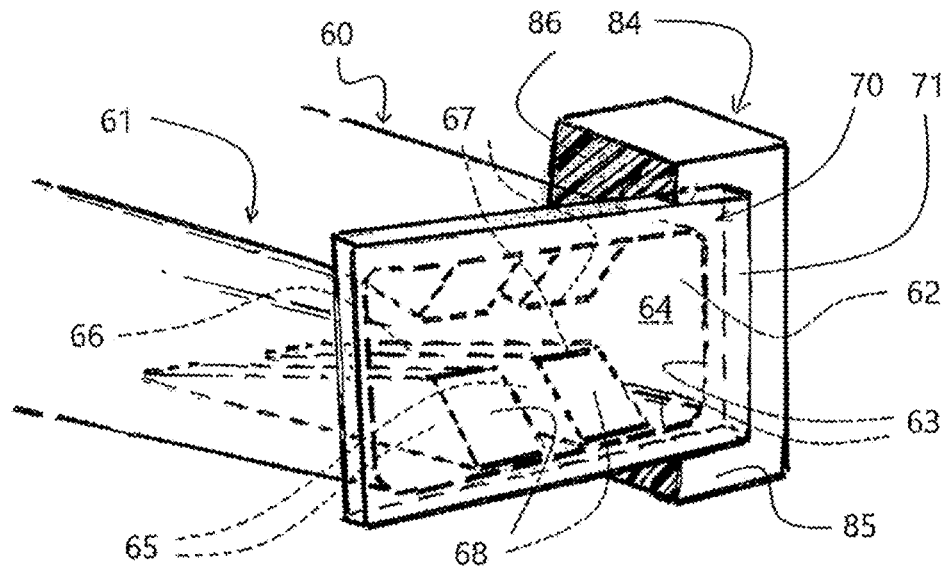
FIG. 2 is a detailed front perspective view of the operative end of a microwave applicator according to the disclosure.
Figure 3:
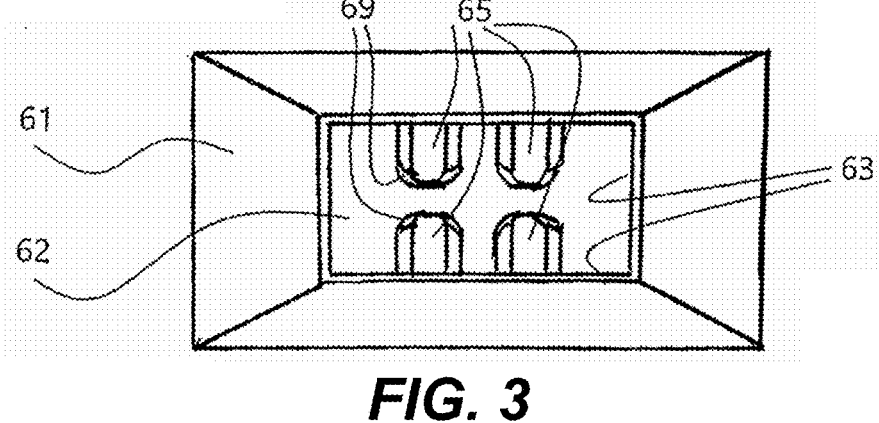
FIG. 3 is a front view of the mouth of an applicator according to the disclosure.
Figure 4:
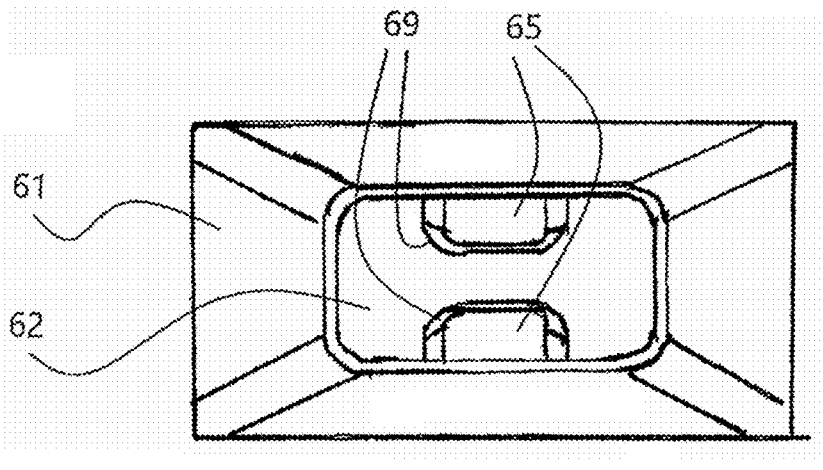
FIG. 4 is a front view of the mouth of an alternative construction of applicator.

In the illustrated embodiments in FIGS. 2 to 4, there are provided at least one pair of ridges 65 with the ridges of each pair being generally opposite each other so that the cross-sectional area of the tubular section 61 reduces generally symmetrically from opposite sides thereof. In FIGS. 2 and 3, the tubular section is generally rectangular in cross section and there are four ridges 65, two of the ridges extending from the upper wall of the rectangular tubular section 61 and the other two ridges facing the first two ridges and extending from the opposite lower wall of the rectangular section. In FIG. 4 there is an alternative possible construction with one pair of ridges 65, one ridge extending from an upper wall of the tubular section 61 and the other being located and facing the first ridge by extending upwardly from the lower wall of the tubular section 61.

As best seen in FIGS. 3 and 4, the ridges 65 have rounded convex corners 69 when viewed in cross section transverse to the direction of microwave propagation, the rounded convex corners reducing the incidence of local electromagnetic field maxima at the edges. Such maxima can promote arcing with consequent loss of control of the application of microwave radiation to treat the animal.

Figure 5:
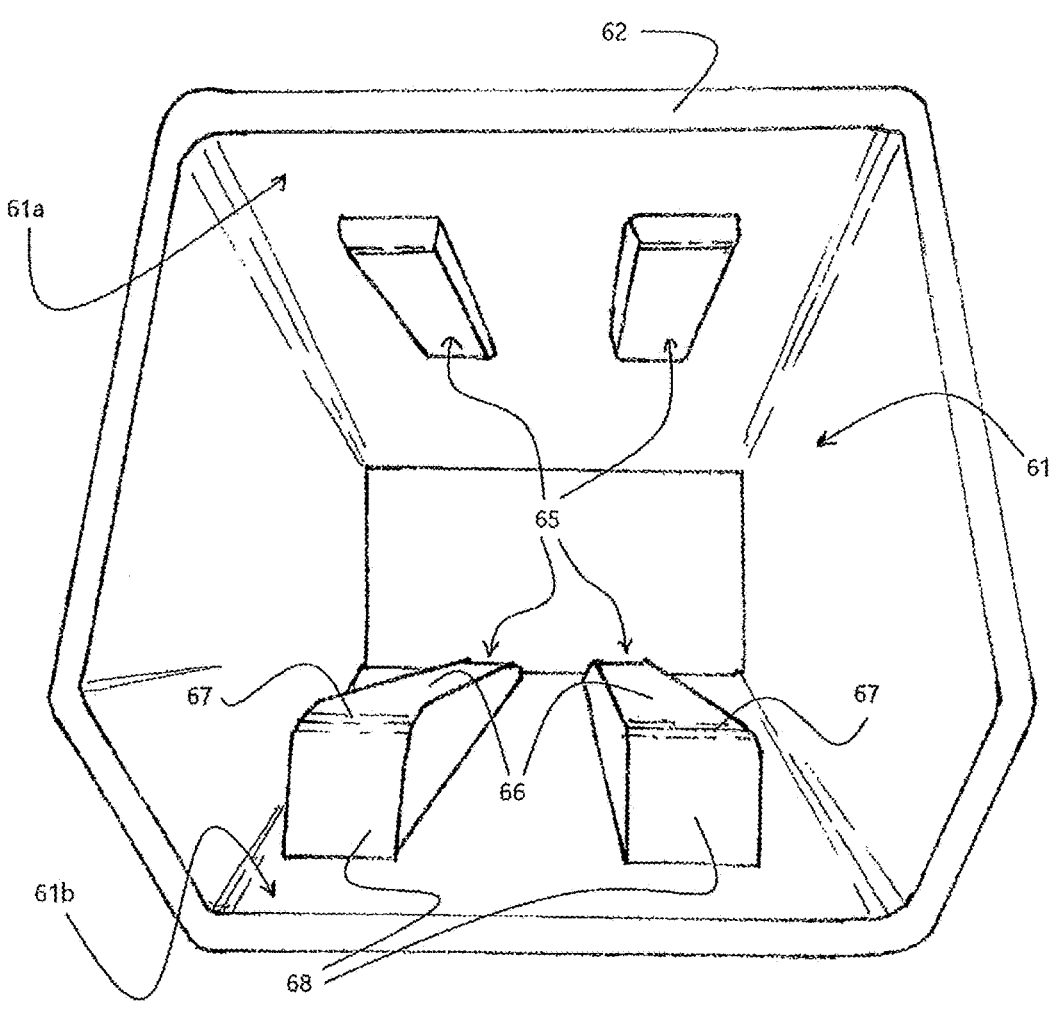
FIG. 5 is a front view into the mouth of a further alternative applicator.

In the embodiment in FIG. 5, there are provided two pairs of ridges 65 with the ridges of each pair being generally but not symmetrically opposite each other so that the cross-sectional area of the tubular section 61 reduces from opposite sides thereof. Two of the ridges extend from the upper wall 61a of the rectangular tubular section 61 and the other two ridges facing, but laterally offset from, the first two ridges and extending from the opposite lower wall 61b of the rectangular tubular section 61. With the non-mirror image configuration of the upper and lower wall ridges formation of a standing wave in the tapering section of applicator 60 may be inhibited.

The use of four ridges has been found to produce better control of the energy (as assessed by reactions of the animals and recording of their brainwaves). This applies to bovine animals, but the numbers and configurations of ridges can vary for different animals (species and varieties). Such details are empirically determined.

Figure 6A:
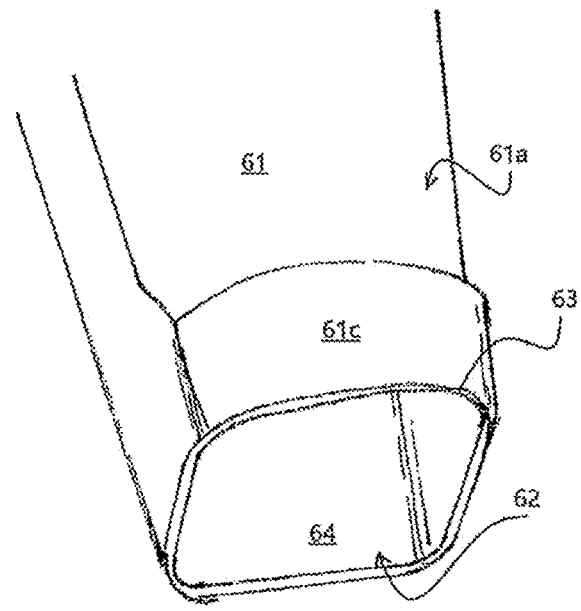
FIGS. 6A, 6B, and 6C are partial perspective and side sectional views of further alternative applicators and their placement at the animal's head.
Figure 6B:
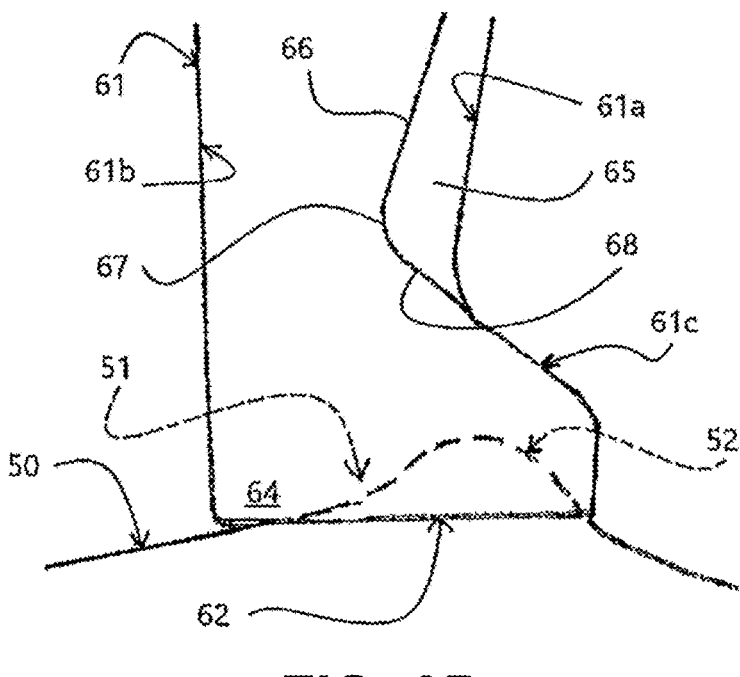

In the embodiment in FIGS. 6A and 6B, the application zone 51 comprises a region overlying at least part of one of the parietal lobe and the occipital lobe of the animal's brain and the mouth 62 has a peripheral shape to overlie at least part of the poll 52 of the animal's head. There is provided a single ridge 65 that extends from an upper wall 61a of the tubular section 61 closer to the poll 52 than an opposite lower wall 61b of the tubular section 61 closer to the animal's nose, whereby the electric field strength is increased by the ridge 65 at the upper wall 61a closer to the poll. The upper wall 61a of the tubular section closer to the poll 52 leads to an upwardly widened terminal end 61c so that the mouth 62 is of larger area than the internal cross-sectional area of the tubular section immediately before the terminal end 61c and the mouth 62 in use overlies the poll 52 of the animal's head.

In an experimental apparatus used to test heating via the poll, the waveguide applicator began as a standard WG4 (UK) or WR975(USA) waveguide supporting the fundamental TE01 mode and then tapered from 248 mm (broad wall) to approximately 130 mm. A tapered ridge was located on the broad wall almost all the way to the mouth or interface between applicator and animal head. The tapered ridge was located on the poll side of the waveguide in order to increase the electric field strength in the vicinity of the poll and to allow energy to propagate through the narrowing waveguide. The applicator was further tapered and rounded in the vicinity of the poll, so that the poll was substantially covered by the mouth of the applicator allowing greater electric field strengths to penetrate the poll. The general center line of the applicator could be aligned substantially to the application point on the animal's forehead (as in the previous patent specifications) but the spreading of the area to encompass the poll helped to reduce possible blistering.

The application of microwave energy at the poll may represent a novel and unsuspected approach to inducing unconsciousness of the subject animal. The previous patent specifications referenced herein have specifically directed away from rear or deeper brain tissue heating or brain stem heating. However, the seat of animal consciousness may include such parts of the brain/brain stem so effective syncope may be achieved by heating at the poll, particularly if reversible stunning is not an objective and pre-slaughter stunning is wanted. In some bovine species or varieties better access to suitable heatable brain sections can be achieved via the poll (e.g., through spongy tissue beneath the poll) even though that location for heating may not provide the shortest path to the brain tissue.

Figure 6C:
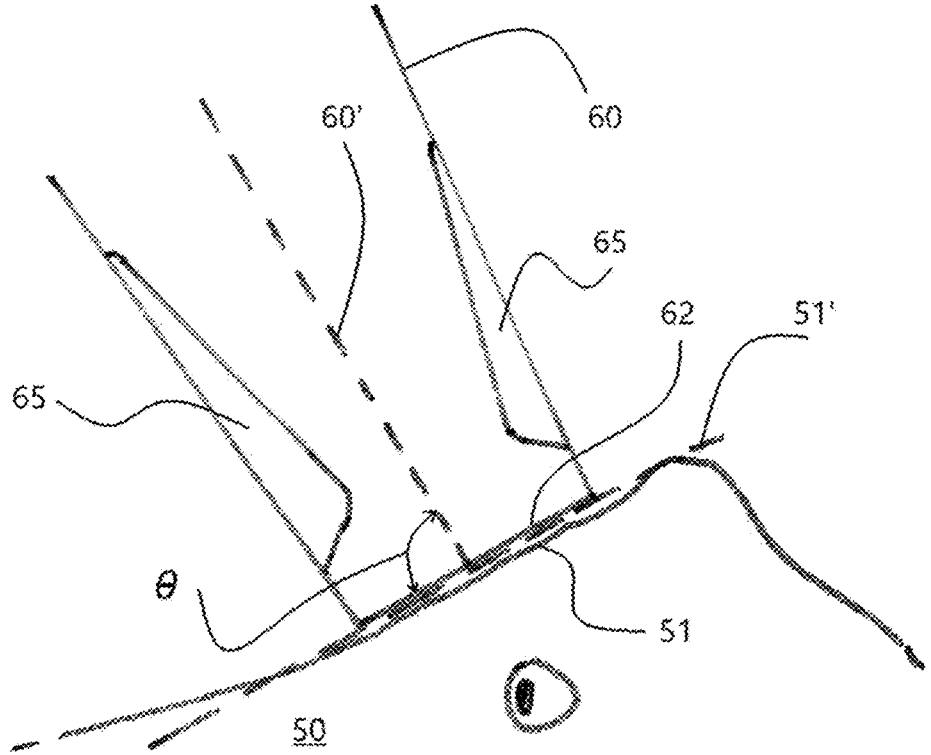

In FIG. 6C, the applicator 60 has a generally longitudinal axis 60' extending in the general direction of microwave radiation propagation therethrough and the mouth 62 of the applicator defines a plane that is not orthogonal to the longitudinal axis 60' whereby the applicator 60 is located against the animal's head 50 so that the longitudinal axis 60' is at an angle Q of between 70 degrees and 80 degrees to the general plane 51' of the application zone 51 and microwave radiation is directed partially rearwardly (caudally) toward the brain and away from nasal passages of the animal. In some bovine animals, and possibly other species, this angling of the axis of the applicator may help to reduce losses associated with moisture in the nasal passages of the animal by preferentially causing heating in tissues, particularly the brain, located caudally relative to the application zone.

In use of the embodiment of FIGS. 6A, 6B, and 6C, e.g., as schematically shown in FIG. 1B, microwave applicator 60 is located against or closely adjacent to the animal's head 50 and the mouth 62 being shaped to overlie an application zone 51 of the animal's head, the application zone comprising a region beneath which the animal's brain is located. The application zone comprises a region overlying at least part of one of the frontal lobe and the parietal lobe and the occipital lobe of the animal's brain and, in FIGS. 6A and 6B, the mouth 62 has a peripheral shape to overlie at least part of the poll 52 of the animal's head.

As illustrated schematically in FIG. 2, a spacer 70 comprised by a microwave-permeable window 71 is located at the mouth 62 so that the edges 63 of the tubular section 61 defining the mouth 62 will be spaced from the animal 55 by distance equal to or greater to the thickness of the window 71. This can reduce the effects of localized field maxima on the animal's skin or hide surface, in particular, singeing or blistering or burning of the skin or hide surface. This is achieved because the microwave-permeable spacer 70 functions as an electromagnetic field flux disperser at the mouth 62 reducing the field intensity at the surface of the forehead and inhibiting arcing. In particular, the spacer 70 is located between the edges 63 of the mouth 62 and the surface of the forehead of the animal 55. In operation, the step of locating the microwave applicator 60 closely adjacent to the forehead (application zone 51) of the animal 55 comprises abutting the microwave-permeable spacer 70 against the forehead of the animal. By creating this abutting relationship, the edges 63 of the mouth 62 do not vary substantially in separation distance from the relatively flat portion of the forehead (application zone 51) of the animal.

As shown in FIG. 2, the microwave-permeable window 71, which constitutes the spacer 70, is closely adjacent to or preferably is contacting but is outside of the mouth 62. The window 71 illustrated has a greater area than the mouth 62 so that it overlaps the perimetric edges 63 of the mouth. However, it can also be sized to closely match the size of the mouth 62 and in fact may closely fit into the mouth 62 by a short distance and project beyond the mouth edges 63 by a distance equal to the desired separation of the mouth from the forehead surface. The microwave-permeable window 71 may be made of any suitable microwave-permeable material, such as a sheet of mica or PTFE. The thickness of the window 71 may be about 2-5 mm and may depend, for example, on the dielectric properties of the material of the window. Tests with a 5 mm thick mica sheet and a 3 mm thick PTFE sheet have been successfully conducted.

Also as shown in FIG. 2, the window 71 can be sized and located to substantially close the mouth 62 to ingress of foreign matter into the tubular section 61, particularly ingress of particles, dust, animal hair, water, droplets, and steam that can condense to form water droplets, etc. Such foreign matter can promote arcing within the tubular section 61 when microwave radiation is propagating through the tubular section toward the mouth. Such arcing destroys the ability to control the application of microwave energy to warm the frontal portion of the animal's brain and arcing between the applicator and the animal can cause singeing or burning at the skin or hide surface with presumed trauma and suffering.

The use of a spacer 70 constituted by a microwave-permeable window 71 will lead to microwave power leakage because the mouth 62 through which the microwave radiation emerges is spaced by the thickness of the window 71 from the surface of the animal's head. This is a disadvantage of the applicator of FIG. 2 and its method of use. However, microwave shielding, including the Faraday cage 80 as schematically illustrated in FIGS. 1A and 1B, can prevent any significant danger to operators of the system or to others in its vicinity. The microwave radiation leakage is also a loss of efficiency of the energy transfer to effect the warming of the brain, which efficiency has been a principal focus of features of the systems disclosed in WO2011/137497 and WO2014/066953. However, despite the energy leakage, the combination of the applicator with internal ridges to enable reduction in size of the mouth while maintaining an effective energy flux density of the emerging radiation in combination with the microwave-permeable spacer has surprisingly enabled simultaneous satisfaction of the objectives of producing an effective energy flux density, a small size of mouth for use with smaller animals and/or more targeted heating, as well as addressing animal welfare issues as earlier described. For example, test using the applicator of FIGS. 2 and 3 with a PTFE spacer on multiple test bovine heads involved application of microwave radiation for 5 seconds at 20 KW power produced an improved heating rate efficiency of nearly 70% based on average heating rate of animal brain compared to tests with an applicator of prior systems disclosed in WO2011/137497 and WO2014/066953. The improvement is believed likely to have resulted from higher concentration of energy caused by smaller size of mouth of the applicator, but also there was simultaneous improvement of animal welfare outcomes. These tests did not use an auto tuner, which would have further improved the heating rate efficiency.

To further alleviate potential operational safety issues arising from microwave leakage resulting from the spacing of the mouth 62 from the forehead surface (application zone 51), the applicator in FIG. 2 has a microwave absorptive shield 84 associated with the applicator and surrounding a transfer zone through which the microwave energy passes from the mouth 62 of the applicator to the surface of the forehead (application zone 51) of the animal. Only a part of shield 84 is illustrated and is shown sectioned, but in practice it will completely surround the periphery of the spacer 70 and may extend a short distance along the walls of the tubular section 61 as depicted. The microwave absorptive shield 84 is not opaque to microwave radiation, e.g., is not made of metal as that might re-introduce the occurrence of local high electric fields at the edges of a metal shield and consequent arcing. Instead, the shield 84 contains or is composed of material(s) and/or structure(s) that absorb microwave energy. For example, the microwave absorptive shield 84 may contain liquid phase water contained in a shielding body 85 located to surround the transfer zone. The shielding body 85 may be a shaped container for the water, e.g., a shaped sponge body 86 impregnated with water and located to surround the peripheral edges of the separating space between the mouth 62 and the forehead surface (application zone 51). The water may be replenished in use as it heats from microwave radiation exposure and evaporates.

Other microwave absorptive materials may be useable, such as a suitable gel (particularly a water-based gel), or some graphite or other carbon compounds or materials, ferrite powder, silicon carbide, foam substances. The shielding body 85 may be retractable, e.g., for servicing such as cleaning, sterilizing, etc., of the applicator.

In a further possible embodiment (not illustrated), the tubular section 61 can be at least partially filled with a suitable dielectric material, such as PTFE, to enable a greater flux density of microwave radiation to propagate therethrough and/or to enable smaller area of mouth 62 to be provided while achieving the desired effective flux density to be applied to the animal 55.

Figures 7A, 7B:
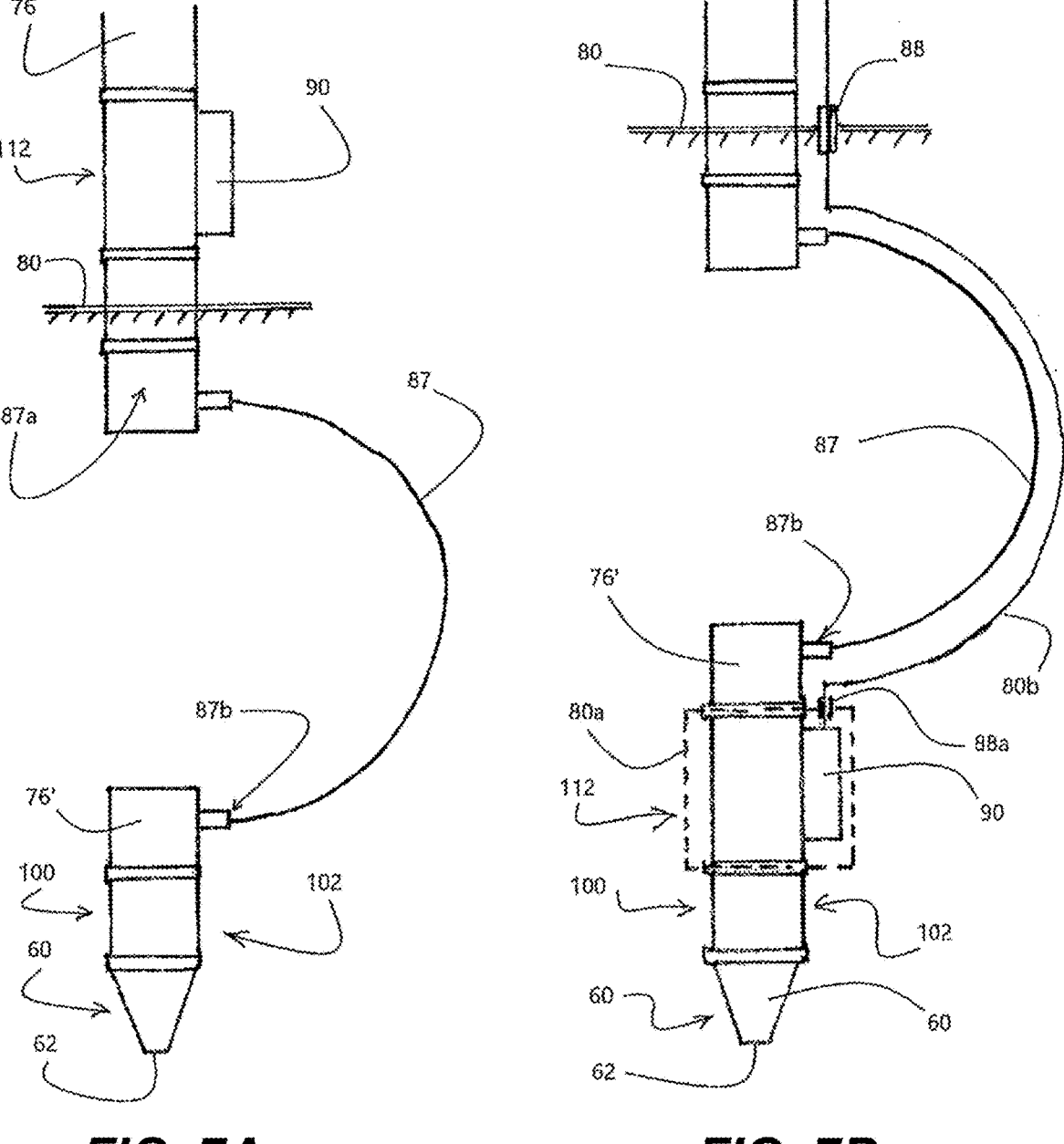
FIGS. 7A and 7B are schematic views of two embodiments of the microwave transmission paths.

In the embodiments of FIGS. 7A and 7B, the applicator 60 includes a microwave path along which microwave radiation travels in use and a mouth 62 through which the microwave radiation emerges. The mouth 62 is sized to overlie the application zone 51 of the animal's head 50. A microwave generator (not shown) generates microwave energy of a suitable power level and frequency and a microwave energy transmission path receives and directs the microwave energy from the generator to the applicator 60 located at an operative end of the microwave energy transmission path to thereby heat the animal's brain beneath the application zone in the proximity of which the mouth of the applicator is located in use. The microwave energy transmission path includes a flexible transmission cable 87 (high power coaxial cable) enabling movement of the applicator 60, e.g., by a positioning system 89 shown in FIG. 1B, to locate the applicator 60 over the application zone. The microwave transmission path further includes an applicator waveguide 76' leading from the transition 87b to which the cable 87 leads and in which microwave radiation is guided toward the applicator 60.

FIG. 7A shows an apparatus of the kind schematically shown in FIG. 1B in which auto-tuner 90 is located outside of the Faraday cage 80 upstream of the flexible cable 87. With this configuration any momentary large mismatch of impedance between the load (animal's head) and the applicator may cause a large peak in the electric field in the cable 87, which may exceed the power rating of the cable 87 thereby causing electrical breakdown.

FIG. 7B shows an alternative apparatus of the kind schematically shown in FIG. 1B in which auto-tuner 90 is now re-located inside of the Faraday cage 80 downstream of the flexible cable 87. With this configuration the cable 87 is protected by the auto-tuner 90 from large reflected power loads arising from mismatch of impedance between the load (animal's head) and the applicator. Also, if there is a flaw or fault in the cable or associated connectors, the auto-tuner, if upstream thereof, will tune into the cable effects, not the animal's head, thereby giving rise to a standing wave and high electric fields that can damage the cable or connectors, e.g., by causing arcing. By locating the auto-tuner downstream of the cable, it will tune to the animal's head as required and avoid any equipment damaging standing wave. The auto-tuner in FIG. 7B has its local shielding 80a to protect electronic or electromechanical componentry associated with the auto tuner from damage by high electromagnetic fields arising in use within the Faraday cage 80. Shielded signaling and control cable 80b likewise is protected against damage and it passes through the shielding 80a through a choke 88a prevent radiation entering the shielding 80a.

In FIGS. 7A and 7B, the microwave energy transmission path 100 downstream of the auto-tuner 90 has at least one physical feature or a conformation that is selectively adjustable to adjust the impedance of the applicator 60 to match with the load to which microwave radiation passing though the microwave path and emerging from the mouth 62 has been applied. The selectively adjustable physical feature or conformation of the microwave energy transmission path 100 is in use adjusted to provide an optimum impedance of the applicator 60, which is preselected before any animal stunning operations are performed so as to approximate an expected impedance of the subject animal's head 50. The adjustable physical feature or conformation of the microwave energy transmission path 100 of the applicator is provided by a manual tuner 102, which comprises at least one selectively moveable body located within the microwave path and enables selective adjustment of the impedance of the applicator to pre-tune the applicator 60 before first use of the apparatus to induce unconsciousness of subject animals.

Figure 8:
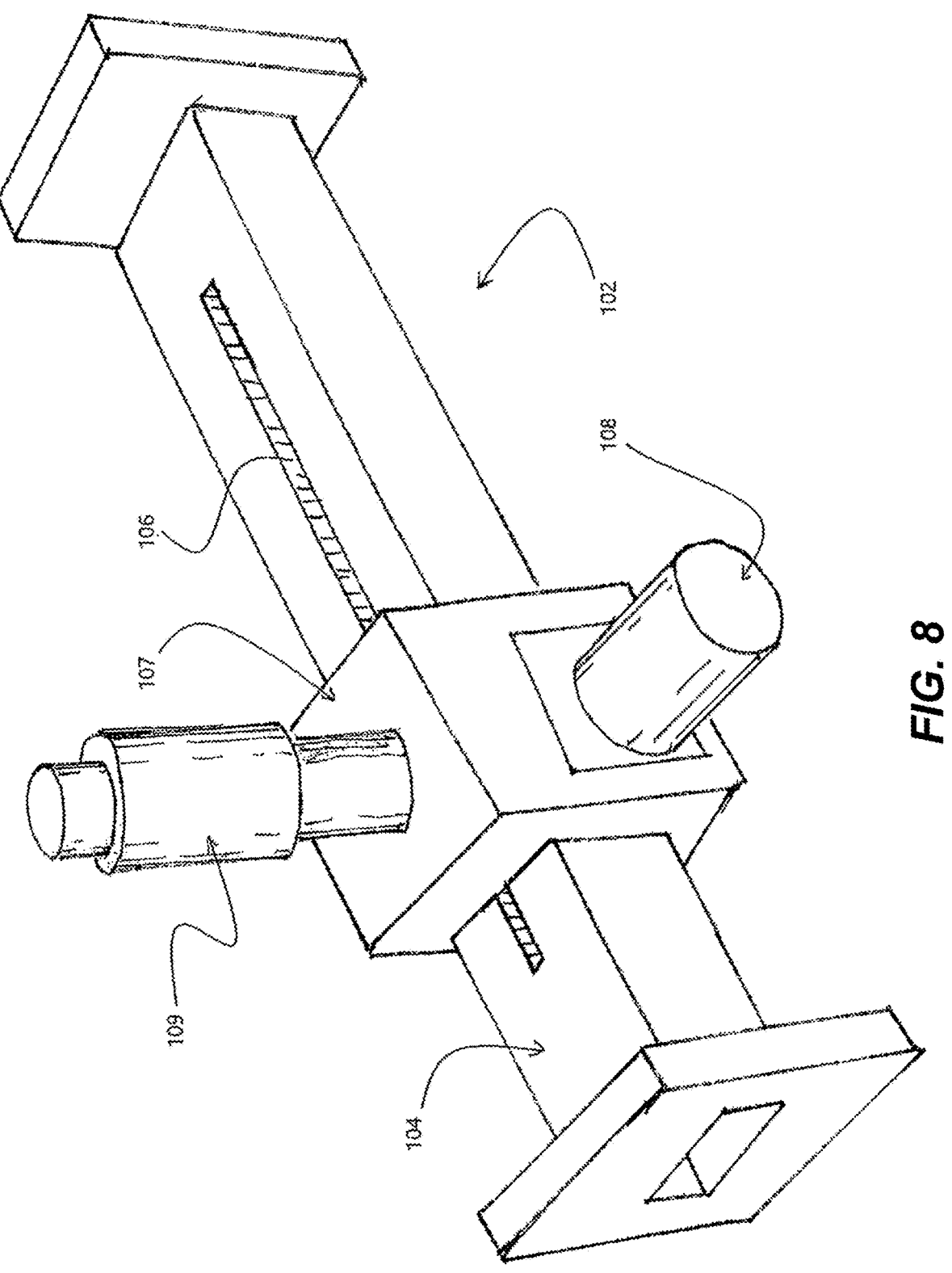
FIG. 8 is a perspective view of a pre-tuner to be connected to direct microwave energy to the applicator.

As shown in FIG. 8, the tuner 102 provides therein a passage for microwave transmission from the upstream waveguide 76 or applicator waveguide 76' to the applicator 60. The adjustable physical features or conformation of the microwave path of the applicator comprises at least one selectively moveable body located within the microwave path and operative to enable selective adjustment of the impedance of the applicator. Two selectively moveable bodies are preferred although only one is shown in FIG. 8. This comprises a metallic or other microwave affecting body that is selectively moveable within the microwave path. These can be metallic (e.g., aluminum) stubs of cylindrical shape movable into and out of the path as well as longitudinally along the direction of the microwave path. The tuner 102 includes a waveguide portion 104 of generally constant internal cross-sectional area leading to the applicator 60 having the tapering or narrowing section of internal cross-sectional area reducing in the direction of the mouth 62.

As seen in FIG. 8 the waveguide portion 104 of generally constant internal cross-sectional area has a slot 106 in a wall thereof, the slot 106 extending generally longitudinally in the direction of the microwave radiation propagation through the waveguide portion. A moveable metallic or other microwave affecting body (or "stub") within the waveguide portion 104 is moveable longitudinally by external manipulation of a movable carriage 107, which can be slid along the slot 106 and locked in position by releasable locking means 108 after movement thereof along the slot to its desired position. The metallic or other microwave affecting body can also be selectively extended further into or retracted laterally from its position projecting into the waveguide portion 104 by manipulation of the handle 109, which is drivingly connected to the body projecting into the microwave path. The manual tuner 102 can, therefore, tune the applicator to an expected impedance of the load (animal's head) to thereby provide a good starting impedance match when the animal stunning operation is first initiated and prior to the auto-tuner 90 managing the dynamic tuning during the application of microwave energy in a stunning operation.

In operation of the apparatus of FIGS. 7A, 7B, and 8, the stunning process will comprise the preliminary steps:

locating the applicator 60 in operative relationship in proximity to a load (not shown), which approximates the conformation and dielectric properties of the (future) subject animal's head expected to be stunned;

generating low power microwave radiation and directing it through the microwave path 100 and into the applicator 60 to emerge at the mouth 62 and, thence, to be applied to the load;

detecting reflected power of the microwave radiation in the applicator 60 during the application of the low power microwave radiation to the load;

adjusting the impedance of the applicator 60, 100 to change the impedance match of the applicator with the load;

repeating these three steps until an optimum impedance of the applicator 60, 100 that best matches with the impedance of the load is determined as indicated by a minimum reflected power being detected in the multiple repetitions of the three steps;

adjusting the impedance of the applicator 60, 100 to match the optimum impedance determined so as to provide a calibrated applicator, followed by the animal stunning steps of:

introducing the subject animal to a stunning station where the animal is to be stunned;

restraining the subject animal's head at the stunning station;

locating the calibrated applicator 60, 100 in the proximity of the application zone of the subject animal's head;

generating microwave radiation of a suitable power level and frequency and directing the radiation along a microwave path to the calibrated applicator 60, 100 so that microwave radiation passing through the applicator and emerging through the mouth thereby heats the animal's brain beneath the application zone;

detecting at a location upstream of the applicator 60, 100 reflected power of microwave radiation and, in response to the level of reflected power, tuning by operation of the auto-tuner 90 the microwave path during the continued direction of the microwave radiation through the waveguide 76, 76' and through the calibrated applicator 60, 100 so as to reduce the reflected power being detected and thereby change the impedance of the microwave path and the calibrated applicator to substantially match the impedance of the animal's head and thereby increase the transfer of microwave power to the animal's head;

continuing the application of the microwave radiation to effect the heating for a period of time to raise the temperature of the parts of the animal's brain beneath the skull at the application zone, the period of time being sufficient to induce insensibility of the animal.

The preliminary steps can be performed once only to provide the calibrated applicator 60, 100 optimized for a particular animal species and physical characteristics that have heads having conformation and dielectric properties approximated by the load. After the calibrated applicator 60, 100 has been used for stunning of multiple similar animals, the preliminary steps can be repeated before the applicator is to be used for a number of further animals similar to each other but different from the animals of the first usage in characteristics selected from:

animals of different age, animals of different size, animals of different breeds, animals of different species, animals having differing skull shapes, animals having differing skull bone densities, so as to thereby provide a recalibrated applicator 60, 100 for a second usage involving the stunning of the further animals.

The load (not shown in FIG. 7A, 7B, or 8) used in the preliminary tuning of the applicator 60, 100 may comprises a cadaver animal head.

The low power microwave radiation generated and used in the preliminary tuning does not produce significant heating of the load resulting in significant change in the dielectric properties of the load during the pre-tuning. The process comprises multiple individual and discrete repetitions of the detecting and adjusting steps, and during the process each repetition the reflected power of microwave radiation is recorded. The optimum impedance of the applicator 60, 100 comprises selecting from the repetitions the impedance that was the minimum of the recorded reflected power detections. Any suitable network analyzer can be used for the pre-tuning, such as a portable handheld Fieldfox microwave network analyzer supplied by Keysight Technologies (Mulgrave, Victoria), however, any network analyzer will be usable provided its frequency range is adequate.

The preliminary process can comprise continual adjustment of the impedance of the applicator 60, 100 while the low power microwave generation is performed continuously so as to tune the applicator until the optimum impedance indicated by a minimum in the detected reflected power is determined. Then the process includes fixing the applicator 60, 100 by using locking means 108 and against variation of its impedance to deviate from the optimum impedance.

The auto-tuner 90 uses a directional coupler associated with the microwave path or waveguide 76 or 76' and operable to measure the complex reflection coefficient of the animal's head thereby enabling determination in real time of the power being transferred through the calibrated applicator 60, 100 to the animal's head. The calibrated applicator in FIG. 7B is located immediately adjacent to and receiving microwave radiation from auto-tuner 90, which performs the real-time tuning during an animal stun, auto-tuner being located downstream of the flexible cable 87 through which power at the microwave frequency is transmitted to adaptor 87b where the microwave radiation is generated and travels through the applicator waveguide 76'.

Summarizing the advance made by the pre-tuning of the applicator, tuning or impedance matching is a known operation in microwave systems; however, what the disclosure provides is a two-stage approach of a preliminary manual or fixed stub tuning and later auto-tuning used together. The preliminary tuning gets very close to an initial impedance match so efficient operation of the stunning process commences very quickly (improving both animal welfare and efficiency). Then as the animal's dielectric properties change with temperature, skull shape, or movement, etc., the auto-tuner will account for and adjust the match to ensure efficient power transfer to the animal's head.

In the systems of FIGS. 1A, 1B, 7A, 7B, the auto-tuner 90 functions as a compensator 112, which attempts to keep the reflected microwave power at 0% by automatically adjusting physical tuning stubs within the microwave waveguide. The apparatus operates using a set forward microwave power (defined as the microwave power leaving the microwave generator at the start of the waveguide circuit) and attempts to deliver 100% of this power to the animal head at the applicator output, which in test cases was a bovine head. As the bovine heads all differ in their physical characteristics, impedance matching is different for each head, which the auto-tuner attempts to overcome. An ideal outcome of the apparatus would result in high efficiency and minimal wasted (reflected) energy. This system using an auto-tuner is hardware-based, and is expensive.

Figure 9:
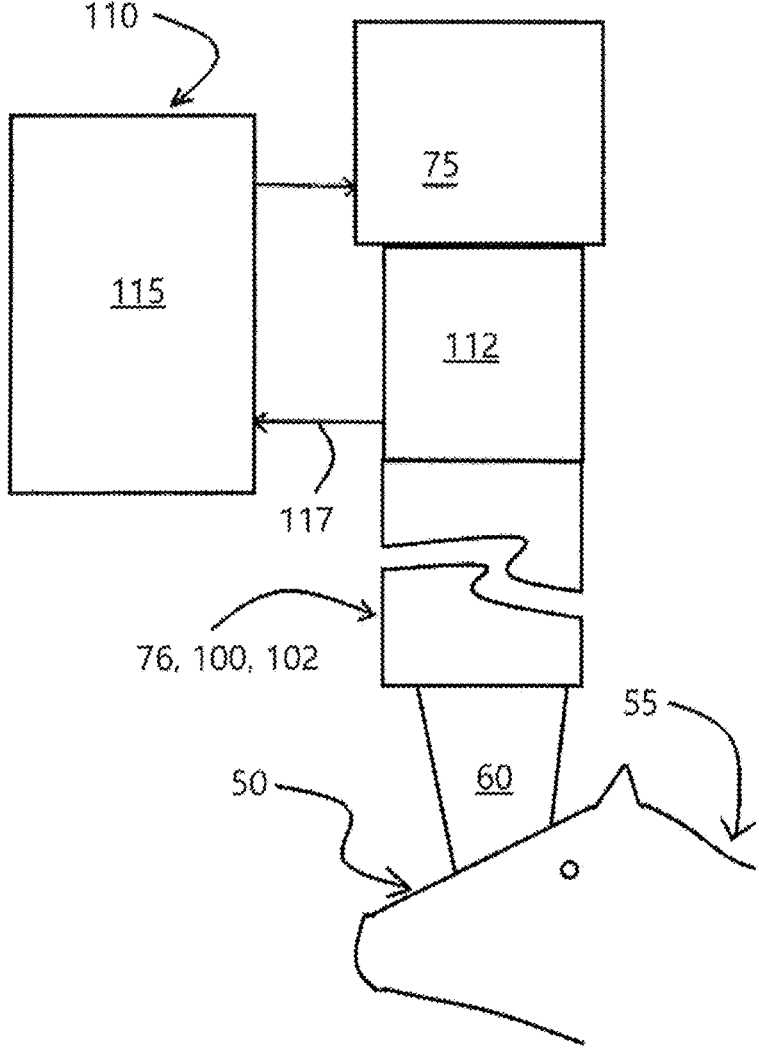
FIG. 9 is a schematic view of a compensator for varying microwave power applied during a stunning operation.

Instead of a combination of directional coupler and auto-tuner 90 functioning to the compensator, FIG. 9 shows an alternative compensator 110 that comprises a reflected power detector 112 and associated power controller 115 operative in response to changes in a level of power detected by the reflected power detector 112 to vary the power from the microwave generator 75 being transferred through the waveguide 76, 100, 102 so as to generally maintain a predetermined rate of energy transfer to the animal's head 50 despite changes in reflected power during a stunning operation. The power controller 115 has an operating program to determine and implement changes to the power being generated by the microwave generator based on a selectively programmable target total energy to be effectively transferred to the animal's head 50 in a programmable target time duration.

The detector 112 is shown as a directional coupler that is operative to detect the forward power from the generator and detected reflected power and to transmit through input line 117 data to the controller 115 regarding those detected power levels. The directional coupler 112 in FIG. 9 is shown located close to the generator 75, however, it would be more effective to locate it as close to the applicator 60 as is practically possible, such as in the embodiment of FIG. 7B.

In general terms, the compensator 110 implements a program that dynamically calculates and adjusts both forward microwave power and energy set point (the target energy to be delivered) in order to produce a combination of net power (defined as the microwave power that is absorbed by the load (animal's head) that equals forward power minus reflected power) stun time and total energy delivered into the brain. Process parameters will correspond to previously determined optimal conditions for humane reversible bovine or animal stun for the sake of slaughter. It is a software-based component that integrates and interacts with the entire system.

The compensator 110 of FIG. 9 can be essentially a software component that utilizes existing hardware built into the existing system of microwave generator through to applicator. This can result in a significant upfront cost saving. The compensator aims to dynamically adjust forward power to compensate against any reflected power in order to maintain a steady net power. The net power is constantly monitored, and any variations are compensated by adjustments to the forward power. The stun will continue until the predetermined total required energy has been delivered. When compared to a system using the auto-tuner, there will be a reduction in efficiency but significant upfront savings for every system.

The compensator 110 operates based on parameters that have previously been determined to produce optimal humane, reversible stun conditions. These parameters include specific combinations of net power, stun time and total energy. Depending on the speed of the adjustments and possible spikes in reflected power, stun time may extend beyond a desirable length for the given energy set point. The compensator 110 dynamically compensates by slightly raising the energy set point to match a net power, stun time and energy set point combination that results in optimal stun conditions.

To ensure that the compensator 110 operates at its maximum efficiency, a broadband tune is applied to the applicator 60 using manual tuning stubs and specific applicator design as described above in relation to FIGS. 7A and 7B. This specific type of tune enables the best overall tune for a large range of bovine head types. Various tuning combinations may be manually set for different groups of bovines.

By using the forward power to compensate for reflected power, the overall power rating of the system components must meet a higher rating, which may preclude the use of lower rated components, such as coaxial cables 87 and coaxial/waveguide transitions 87a, 87b as used in FIGS. 1A, 7A, 7B. All components will need to be rated to or exceed the maximum forward power that the software or hardware will allow.

Figure 10A:
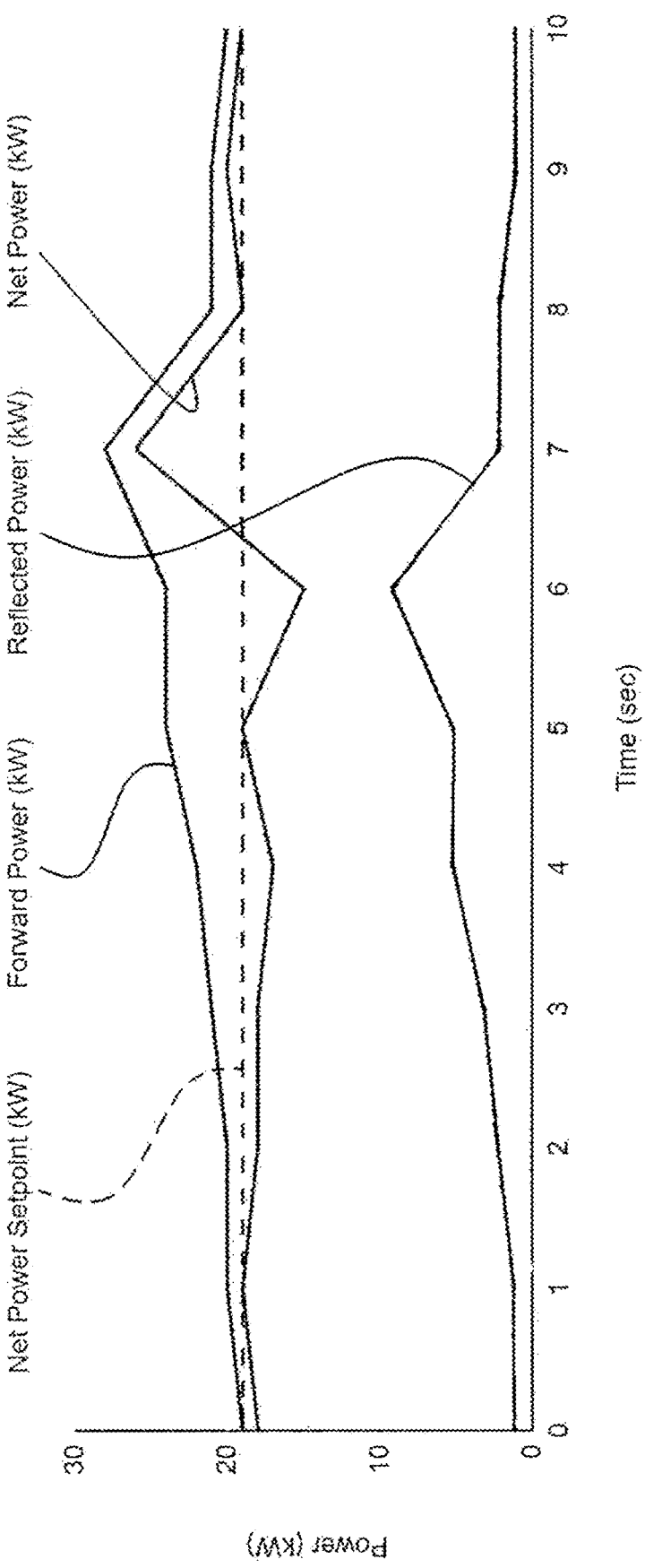
FIGS. 10A and 10B are graphs that depict power and energy transfer during a stun using a compensator such as shown in FIG. 9.
Figure 10B:
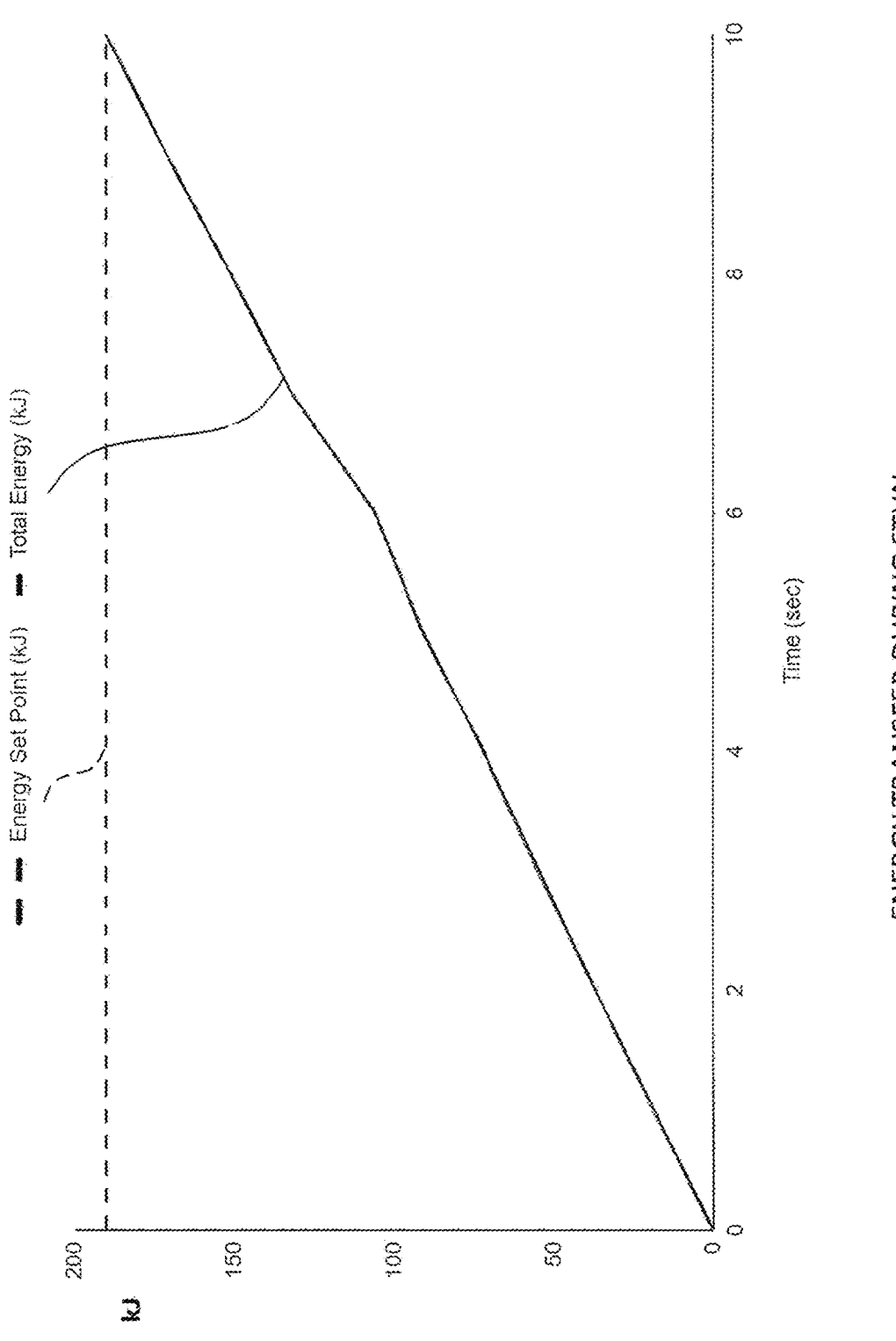

FIGS. 10A and 10B are graphs that show a simplified example of how the compensator 110 operates. The compensator's ability to compensate for reflection is 1 duty cycle behind, which produces an almost linear total energy curve. In the graphs the cycle rate is 1 hertz. In actual practice, the rate of compensation or step in power per duty cycle, might operate like a PID loop in order to produce a smooth output and reduce sudden spikes and instability. A PID controller 115 (or proportional-integral-derivative controller of conventional operation) would operate to continually monitor programmed or calculated desired set points and compares them to the actual values (process variables). In the present case there will be a required energy profile made up of (1) desired net power absorbed into the head and (2) time length of application. The PID controller will continually adjust via control signals output the forward power produced by the generator to maintain the desired net power delivered into the head irrespective of the reflected power variations.

In FIG. 10A, the net power is being adjusted by the difference between the net power set point and reflected power of the previous cycle. In FIG. 10B, the accumulating energy delivered is shown by the plot up to the time when the predetermined energy set point is reached when application of microwave energy is terminated. The plot showing energy being delivered will not always be perfectly linear but will likely oscillate around the ideal linear graph. The methods of treating animals particularly to produce unconsciousness by targeted application of microwave radiation to the frontal portion of the animal's brain using the apparatus described herein in relation to the drawings can be readily understood from the preceding description and by reference to the prior patent specifications mentioned herein that describe processes and operating parameters in more detail. Insofar as details in those patent specifications are relevant to put the disclosure into practice, the descriptions in WO2011/137497 and WO2014/066953 are incorporated herein by this cross-reference. It will also be understood that operating parameters can vary for different animals and even different jurisdictions, e.g., use of 922 MHz frequency in Australia, 896 MHz in UK, etc., as specified under applicable official Regulations governing allocation of EM frequency bands for different uses. Bovine stunning is now being successfully achieved using the aspects of the disclosure utilizing 18 kW power levels and as low as 100 k energy transfer. Larger animals such as buffalo may require 180 kJ for a successful stun and the use of a permeable spacer may be more desirable for such higher energy transfer.

The methods and apparatus of the disclosure are usable with non-human animals to be treated in a manner so that the unconsciousness is reversible by allowing cooling of the brain by normal physiological processes, such treatments including veterinary procedures or animal processing operations (e.g., de-horning, branding, insemination, inspections). The reversible syncope is also compliant with some religious ritual criteria where an animal to be slaughtered is required to be live and uninjured at the time of slaughter. The method and apparatus are also usable in slaughtering animals with the induced unconsciousness being followed by animal death caused either by continued application of microwaves to cause irreversible brain death or by conventional slaughtering process, e.g., sticking and exsanguination. Animals that can be processed include bovines including calves, ovines and similar species such as goats, porcines, as well as animals slaughtered for pet foods or other products or purposes (e.g., donkeys, camels, horses). Pig slaughtering may be a particularly advantageous field of use to replace CO2 stunning, which studies have shown can produce significant animal trauma. Avian species stunning is not presently envisaged but the principles of construction and operation may in future be adaptable for such use.

It is to be understood that various alterations, modifications and/or additions may be made to the features of the possible and preferred embodiment(s) of the disclosure as herein described without departing from the spirit and scope of the disclosure.

What is claimed is:

1. An animal stunning apparatus for inducing unconsciousness and insensibility of a live subject animal, the apparatus comprising:

an applicator relatively moveable in relation to the live subject animal's head for bringing the applicator into proximity with an application zone of the subject animal's head, the application zone overlying part of at least one of the frontal lobe and parietal lobe and occipital lobe of the animal's brain located beneath the skull, the applicator including a microwave path along which microwave radiation travels in use and a mouth through which the microwave radiation emerges, the mouth being sized to overlie the application zone of the animal's head, the microwave path having physical features or a conformation that is selectively adjustable to adjust the impedance of the applicator to match with a load to which microwave radiation passing though the microwave path and emerging from the mouth has been applied, the selectively adjustable physical features or conformation of the microwave path being adjusted to approximate an optimum impedance of the applicator that is preselected to approximate an expected impedance of the subject animal's head;

a microwave generator for generating microwave energy of a suitable power level and frequency;

a waveguide located to receive and direct the microwave radiation from the generator to the applicator located at an operative end of the waveguide to thereby heat the animal's brain beneath the application zone in the proximity of which the mouth of the applicator is located in use;

a compensator operatively associated with the waveguide and configured to detect reflected power of microwave radiation in the waveguide resulting from the degree of impedance matching between the applicator and the animal's head and that compensates for changes in detected reflected power so as to maintain a predetermined rate of transfer of microwave power to the animal's head; and a switch operable to discontinue the application of microwave radiation effecting heating of the animal's brain beneath the application zone after a period of time sufficient to raise the temperature of the animal's brain to induce unconsciousness and insensibility.

2. The apparatus of claim 1, wherein the physical features or conformation of the microwave path of the applicator comprise at least one selectively moveable body located within the microwave path and operative to enable selective adjustment of the impedance of the applicator.

3. The apparatus of claim 2, wherein the at least one selectively moveable body comprises at least two metallic or other microwave affecting bodies that are each selectively moveable within the microwave path.

4. The apparatus of claim 1, wherein the applicator includes a waveguide portion of generally constant internal cross-sectional area leading to a tapering or narrowing section of internal cross-sectional area reducing in the direction of the mouth, and wherein the selectively-adjustable physical features or conformation is provided in the waveguide portion of generally constant internal cross-sectional area.

5. A method of stunning a subject animal for inducing unconsciousness and insensibility of the animal, the method comprising the steps:

(a) providing an applicator to be located in use in the proximity of an application zone of the subject animal's head, the application zone comprising a region overlying part of at least one of the frontal lobe and the parietal lobe and occipital lobe of the subject animal's brain located beneath the subject animal's skull, the applicator including a microwave path along which microwave radiation travels in use and the mouth through which the microwave radiation emerges from the applicator, the mouth being sized to overlie the application zone of the animal's head;

(b) locating the applicator in an operative relationship in proximity to a load that approximates the conformation and dielectric properties of the subject animal's head at the application zone;

(c) generating low power microwave radiation and directing it through the microwave path of the applicator to emerge at the mouth and thence to be applied to the load;

(d) detecting reflected power of the microwave radiation in the applicator during the application of the low power microwave radiation to the load;

(e) adjusting the impedance of the applicator to change the impedance match of the applicator with the load;

(f) repeating steps (c), (d), and (e) until an optimum impedance of the applicator that best matches with the impedance of the load is determined as indicated by a minimum reflected power being detected in step (d) of the multiple repetitions of steps (c), (d) and (e);

(g) adjusting the impedance of the applicator to match the optimum impedance determined in step (f) so as to provide a calibrated applicator;

(h) introducing the subject animal to a stunning station where the animal is to be stunned;

(i) restraining the subject animal's head at the stunning station;

(j) locating the calibrated applicator in the proximity of the application zone of the subject animal's head;

(k) generating microwave radiation of a suitable power level and frequency and directing the radiation along a microwave path to the calibrated applicator so that microwave radiation passing through the applicator and emerging through the mouth thereby heats the animal's brain beneath the application zone;

(l) detecting at a location upstream of the applicator reflected power of microwave radiation and, in response to the detected level of reflected power, adjusting the microwave power being delivered to heat the animal's brain; and (m) continuing the application of the microwave radiation to effect the heating for a period of time to raise the temperature of the parts of the animal's brain beneath the skull at the application zone, the period of time being sufficient to induce insensibility of the animal.

6. The method according to claim 5, wherein the steps (b) to (g) are performed once only to provide the calibrated applicator optimized for a particular animal species and physical characteristics that have heads having conformation and dielectric properties approximated by the load.

7. The method according to claim 5, wherein, after the calibrated applicator has been used for stunning of multiple similar animals, the steps (b) to (g) are repeated before the applicator is to be used for a number of further animals similar to each other but different from the animals of the first usage in characteristics selected from:

animals of different age, animals of different size, animals of different breeds, animals of different species, animals having differing skull shapes, and animals having differing skull bone densities, so as to thereby provide a recalibrated applicator for a second usage involving the stunning of the further animals.

8. The method according to claim 5, wherein the load used in step (b) comprises a cadaver animal head.

9. The method according to claim 6, wherein the load used in step (b) comprises a cadaver animal head.

10. The method according to claim 7, wherein the load used in step (b) comprises a cadaver animal head.

11. The method according to claim 5, wherein the low power microwave radiation generated in step (c) does not produce significant heating of the load resulting in significant change in the dielectric properties of the load during the steps (c) to (f).

12. The method according to claim 5, wherein step (g) includes fixing the applicator against variation of its impedance to deviate from the optimum impedance and thereby provide the calibrated applicator.

* * * * *